(12) United States Patent
Shin et al.

(10) Patent No.: US 11,199,707 B2
(45) Date of Patent: Dec. 14, 2021

(54) HEAD-MOUNTED DISPLAY DEVICE

(71) Applicant: Samsung Display Co., Ltd., Yongin-si (KR)

(72) Inventors: Dongyong Shin, Seoul (KR); Jang-Youp Shim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 43 days.

(21) Appl. No.: 16/161,072

(22) Filed: Oct. 16, 2018

(65) Prior Publication Data

US 2019/0212561 A1 Jul. 11, 2019

(30) Foreign Application Priority Data

Jan. 5, 2018 (KR) ........................ 10-2018-0001449

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/0123* (2013.01); *G02B 2027/0178* (2013.01)

(58) Field of Classification Search
CPC ............ G02B 27/0172; G02B 27/0176; G02B 2027/0123; G02B 2027/0178; G06T 19/0006
See application file for complete search history.

(56) References Cited

U.S. PATENT DOCUMENTS

| | | | | |
|---|---|---|---|---|
| 6,297,814 B1* | 10/2001 | Masuda | ................. | G02B 30/40 345/204 |
| 7,443,380 B2* | 10/2008 | Nozawa | ................ | G06F 1/1626 345/156 |
| 8,373,630 B2* | 2/2013 | Odoi | ................. | G02F 1/133524 345/87 |
| 9,316,834 B2 | 4/2016 | Makino et al. | | |
| 9,632,315 B2 | 4/2017 | Smith et al. | | |
| 9,805,671 B2* | 10/2017 | Kim | ......................... | G09G 3/03 |
| 9,864,201 B2 | 1/2018 | Kim et al. | | |
| 10,235,916 B2* | 3/2019 | Park | ......................... | G09G 3/03 |

(Continued)

FOREIGN PATENT DOCUMENTS

| | | |
|---|---|---|
| JP | 4496823 | 7/2010 |
| JP | 2015-172616 | 10/2015 |

(Continued)

OTHER PUBLICATIONS

European Search Report dated May 9, 2019, issued on European Patent Application No. 18204480.0.

*Primary Examiner* — Mihir K Rayan
(74) *Attorney, Agent, or Firm* — H.C. Park & Associates, PLC

(57) ABSTRACT

A head-mounted display device including a display panel including a planar portion and a curved portion extending from the planar portion, a controller to provide, to the display panel, a data signal representing an image to be displayed on the planar portion and the curved portion, and a case part on which the display panel is mounted, in which the controller is configured to provide a data signal representing an image that is reduced at a predetermined ratio to the curved portion, as compared with the planar portion.

37 Claims, 21 Drawing Sheets

(56) References Cited

U.S. PATENT DOCUMENTS

| | | | | |
|---|---|---|---|---|
| 2004/0227703 | A1 | 11/2004 | Lamvik et al. | |
| 2012/0021806 | A1* | 1/2012 | Maltz | G06F 3/013 |
| | | | | 455/566 |
| 2012/0092363 | A1* | 4/2012 | Kim | G06F 3/147 |
| | | | | 345/618 |
| 2012/0115422 | A1* | 5/2012 | Tziortzis | G06F 1/1652 |
| | | | | 455/73 |
| 2013/0257775 | A1* | 10/2013 | Lee | G06F 1/1652 |
| | | | | 345/173 |
| 2014/0009449 | A1* | 1/2014 | Jang | G09G 3/20 |
| | | | | 345/204 |
| 2014/0266990 | A1* | 9/2014 | Makino | G02B 27/0172 |
| | | | | 345/8 |
| 2015/0348453 | A1* | 12/2015 | Jin | G09F 9/301 |
| | | | | 345/173 |
| 2016/0062391 | A1* | 3/2016 | Choi | H04M 1/0266 |
| | | | | 361/679.03 |
| 2016/0071457 | A1* | 3/2016 | Kim | G09G 3/3233 |
| | | | | 345/690 |
| 2016/0299346 | A1* | 10/2016 | Allin | G02B 27/0176 |
| 2016/0379606 | A1* | 12/2016 | Kollin | G02B 27/0093 |
| | | | | 345/428 |
| 2017/0132753 | A1* | 5/2017 | Hsiang | G06F 3/14 |
| 2018/0052309 | A1* | 2/2018 | Lee | G02B 3/0006 |

FOREIGN PATENT DOCUMENTS

| | | |
|---|---|---|
| JP | 5999531 | 11/2015 |
| KR | 10-2014-0045292 | 4/2014 |
| KR | 10-2015-0093054 | 8/2015 |

\* cited by examiner

HEAD-MOUNTED DISPLAY DEVICE

CROSS-REFERENCE TO RELATED APPLICATION

This application claims priority from and the benefit of Korean Patent Application No. 10-2018-0001449, filed on Jan. 5, 2018, which is hereby incorporated by reference for all purposes as if fully set forth herein.

BACKGROUND

Field

Exemplary embodiments relate to a head-mounted display device, and more particularly, to a head-mounted display device having an improved viewing angle.

Discussion of the Background

Head-mounted display devices are a head-worn device, which may include a display panel or be coupled to a display panel. The head-mounted display devices may be used to implement augmented reality or virtual reality. A head-mounted display device for realizing augmented reality may provide a virtual graphic image through a semitransparent display. In this case, a user may visually recognize a virtual graphic image and an actual object at the same time. The head-mounted display device for implementing virtual reality provides a virtual graphic image to the user's eyes. The user may experience the virtual reality through virtual contents.

The above information disclosed in this Background section is only for understanding of the background of the inventive concepts, and, therefore, it may contain information that does not constitute prior art.

SUMMARY

Devices constructed according to exemplary implementations of the invention are capable of providing an improved viewing angle.

Additional features of the inventive concepts will be set forth in the description which follows, and in part will be apparent from the description, or may be learned by practice of the inventive concepts.

A head-mounted display device according to an exemplary embodiment includes a display panel including a planar portion and a curved portion extending from the planar portion, a controller to provide a data signal representing an image to be displayed on the planar portion and the curved portion to the display panel, and a case part on which the display panel is mounted, in which the controller is configured to provide a data signal representing an image that is reduced at a predetermined ratio to the curved portion, as compared with the planar portion.

The head-mounted display device may further include a cushion part disposed between the case part and a wearer, and a strap part coupled to the case part, in which the case part, the cushion part, and the strap part may define a viewing point of the wearer with respect to the display panel.

The head-mounted display device may further include a sensor to measure the viewing point of the wearer with respect to the display panel.

The curved portion may include first curved portions disposed on opposite sides of the planar portion in a first direction, and the controller may provide a data signal representing an image that is reduced in the first direction to the first curved portions.

The controller may provide a data signal representing an image that is reduced in a second direction substantially perpendicular to the first direction to the first curved portions.

The curved portion further may include second curved portions disposed on opposite sides of the planar portion in a second direction substantially perpendicular to the first direction, and the controller may provide a data signal representing an image that is reduced in the second direction to the second curved portions.

The controller may provide a data signal representing an image that is reduced in the first direction to the second curved portions.

The first curved portions and the second curved portions may be spaced apart from each other at a corner of the planar portion.

The corner of the planar portion may not be visually recognized by the wearer.

The first curved portions and the second curved portions may be connected to each other.

The controller may provide a data signal representing an image that is reduced at a greater extent to a portion of the curved portion that is disposed further away from the planar portion.

The ratio of the entire curved portion may be A/L, where "A" is a length of the curved portion in the first direction and "L" is a length of an equivalent area of the curved portion in the first direction, and the equivalent area may be on a virtual plane extending from the planar portion, and provides a viewing angle substantially the same as a viewing angle of the curved portion in the first direction when viewed from the wearer's viewing point.

The reduced image may be substantially the same as an image that is not reduced on a virtual plane extending from the planar portion, when viewed from the wearer's viewing point.

One side of the curved portion may contact the planar portion tangentially.

The ratio of the entire curved portion may be A/L, which is represented as the following Equation, $$\frac{A}{L} = \frac{\theta[1 - (R/D)(1 - \cos\theta)]}{(B/D)(1 - \cos\theta) + \sin\theta}, \quad \text{[Equation]}$$

where "R" is a radius of curvature of the curved portion, "θ" is a central angle of the curved portion, "D" is a distance between the viewing point of the wearer and the planar portion, and "B" is a distance in the first direction between a normal line of the planar portion that passes through the viewing point and a point where the planar portion and the curved portion meet.

The ratio may be about 1 at a boundary between the planar portion and the curved portion and decreases at a greater ratio as is disposed further away from the planar portion.

Another side of the curved portion may be perpendicular to a line of sight of the wearer.

The ratio of the entire curved portion may be A/L, which is represented as the following Equation, $$\frac{A}{L} = \frac{\theta}{\tan\theta}, \quad \text{[Equation]}$$

where "θ" is a central angle of the curved portion.

The head-mounted display device may further include an optical system spaced apart from the display panel by a predetermined distance.

The display panel may include a left eye display area and a right eye display area arranged in a left and right direction with respect to the wearer, and each of the left eye display area and the right eye display area may include a planar portion and a curved portion.

The display panel may include a left eye display panel and a right eye display panel arranged in the left and right direction with respect to the wearer, and each of the left eye display panel and the right eye display panel may include a planar portion and a curved portion.

The left eye display panel and the right eye display panel may be separated by a protrusion disposed therebetween.

Each of the curved portions of the left eye display panel and the right eye display panel may include a left curved portion disposed on a left side of the planar portion and a right curved portion disposed on a right side of the planar portion.

The left curved portion and the right curved portion may have substantially the same length in the left and right direction.

The left curved portion and the right curved portion may have different lengths in the left and right direction.

The left curved portion of the left eye display panel may be longer in the left and right direction than the right curved portion of the left eye display panel, and the right curved portion of the right eye display panel may be longer in the left and right direction than the left curved portion of the right eye display panel.

An equivalent area of the right curved portion of the left eye display panel and an equivalent area of the left curved portion of the right eye display panel may contact each other, and the equivalent area of the left or right curved portion may be on a virtual plane extending from the planar portion, and the curved portion and the equivalent area of the left or right curved portion may provide substantially the same viewing angle in the left and right direction, when viewed from the wearer's viewing point.

An equivalent area of the right curved portion of the left eye display panel and an equivalent area of the left curved portion of the right eye display panel may overlap each other, and the equivalent area of the left or right curved portion may be on a virtual plane extending from the planar portion, and the curved portion and the equivalent area of the left or right curved portion may provide substantially the same viewing angle in the left and right direction, when viewed from the wearer's viewing point.

Each of the curved portions of the left eye display panel and the right eye display panel may include upper and lower curved portions disposed on upper and lower sides of the planar portion.

A head-mounted display device according to another exemplary embodiment includes a display panel including a planar portion and a curved portion extending from the planar portion, and a case part on which the display panel is seated, in which the curved portion is configured to display an image that is reduced as compared with an image displayed on the planar portion.

The curved portion may have a resolution higher than that of the planar portion.

The display panel may include a plurality of gate lines, a plurality of data lines crossing the gate lines, and a plurality of pixels defined by the gate lines and the data lines, in which the number of pixels per unit area in the curved portion may be greater than the number of pixels per unit area in the planar portion.

An interval between the gate lines in the curved portion may decrease, as is disposed further away from the planar portion.

An interval between the data lines in the curved portion may decrease, as is disposed further away from the planar portion.

An area of each of the pixels disposed in the curved portion may become smaller, as a position thereof is further away from the planar portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
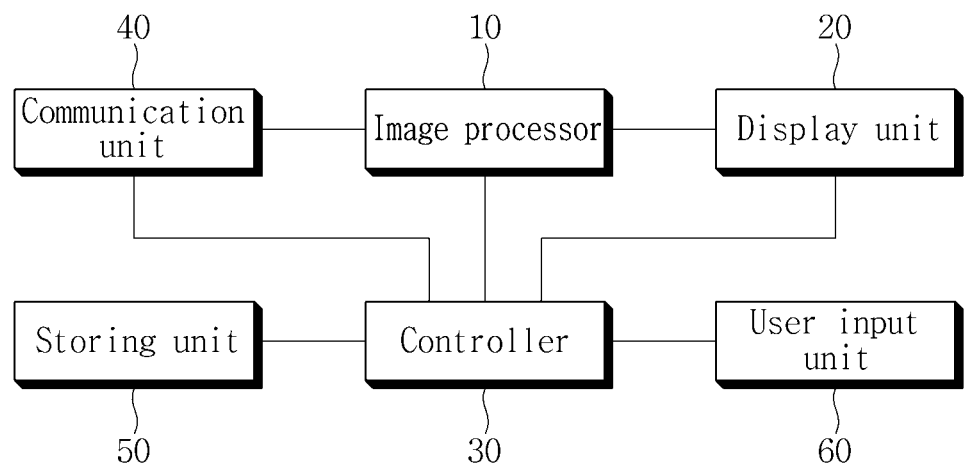
FIG. 1 is a block diagram of a head-mounted display device according to an exemplary embodiment.

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram of a head-mounted display device according to an exemplary embodiment. The head-mounted display device according to an exemplary embodiment may include an image processor 10, a display unit 20, a controller 30, a communication unit 40, a storage unit 50, and a user input unit 60.

The image processor 10 may perform various image processing processes, and the type of the image processing processes performed by the image processor 10 is not particularly limited. For example, the image processor 10 may perform de-multiplexing for distributing a predetermined signal to each characteristic signal, decoding according to the image format of the image signal, de-interlacing for converting an interlaced image signal into a progressive mode, noise reduction for improving image quality, detail enhancement, conversion of a frame refresh rate, or the like. In addition, the image processor 10 may include a decoder, which may decode a source image corresponding to the image format of the encoded source image, and a frame buffer, which may store the decoded source image on a frame-by-frame basis.

The image processor 10 may be implemented as a system-on-chip ("SOC"), through which the aforementioned functions are integrated, or as an image processing board, through which individual components capable of independently performing each of the aforementioned processes are mounted on a printed circuit board.

The image processor 10 may perform various predetermined image processing processes for a broadcast signal including an image signal received from the communication unit 40, and a source image including an image signal received from an image source. The image processor 10 may output the processed image signal to the display unit 20, such that the processed source image may be displayed on the display unit 20. The image processor 10 (or the controller 30 to be described below) may perform a process so that the image may be reduced to be displayed on a curved portion, which will be described in more detail below.

The display unit 20 may display images based on an image signal output from the image processor 10. The display unit 20 may include a display panel 200, on which images are displayed, and a panel driver for processing the input image signal to display the image on the display panel. However, the inventive concepts are not limited thereto, and various methods of implementing images may be applicable. The image signal received from an external input source through an interface may be displayed on the display unit 20 through image processing processes, such as decoding, deinterlacing, scaling, or the like.

The controller 30 may control the overall configuration inside the head-mounted display device. The controller 30 may be separated from or integrated with the image processor 10.

The communication unit 40 may receive a signal of an external input and transmit the signal to the image processor 10 or the controller 30. The communication unit 40 may be connected to various external input cables to receive a signal from a corresponding external input by wire or wirelessly according to a predetermined wireless communication standard.

The communication unit 40 may include a plurality of connectors, to which the respective cables are individually connected. The communication unit 40 may receive a signal from a connected external input, for example, a HDMI signal, a USB signal, a broadcast signal according to the specification of the component, an image signal, a data signal, or the like, or may receive a communication data through a communication network.

The communication unit 40 may include various additional configurations, such as a wireless communication module for wireless communication or a tuner for tuning a broadcast signal, in addition to the configurations that receive signals/data from an external input. The communication unit 40 may also transmit the information/data/signal of the head-mounted display device to an external device. That is, the communication unit 40 may not be limited to a configuration for receiving a signal from an external device, but may be implemented as an interface capable of bidirectional communication. The communication unit 40 may receive a control signal for selecting a user interface (UI) from a plurality of control devices. The communication unit 40 may include a communication module for publicly known short range wireless communication, such as Bluetooth, infrared ("IR"), ultra wideband ("UWB"), Zigbee®, or the like, or may include a publicly known communication port for wired communication. The communication unit 40 may be used for various purposes, such as receiving a command for operating the display, transmission/reception of data, and the like, in addition to the control signal for selecting a UI.

The storage unit 50 may be provided as a writeable nonvolatile memory (e.g., a writable ROM), so that data may remain on the head-mounted display device even when the power is turned off, and may reflect changes of the user. For example, the storage unit 140 may include one of a flash memory, an EPROM, or an EEPROM.

The user input unit 60 may transmit various preset control commands or information to the controller 30 according to a user's operation and input. The user input unit 60 may be implemented by a menu-key or an input panel provided outside the head-mounted display device, or a remote controller separated from the head-mounted display device.

The user input unit 60 may receive the user's motion and voice. The user's motion may include a touch input. The user input unit 60 may directly receive the user's motion and voice, or may receive information of the user's motion and voice from an external device.

In addition, the user input unit 60 may include a display panel 200 (see FIG. 3), an optical system 400 (see FIG. 3), and an adjustor capable of adjusting a distance of the user's viewing point. The adjustor may move the position of the display panel 200 and/or the optical system 400 in forward or backward direction (a Z-axis direction in FIG. 3) from the user's point of view according to the user's operation.

In addition, the user input unit 60 may include a sensor capable of measuring the user's viewing point. A reduction ratio of an image displayed on a curved portion 220 of the display panel 200 (see FIG. 4), to be described below, may be changed according to the measured user's viewing point and the distance of the display panel 200.

Figure 2A:
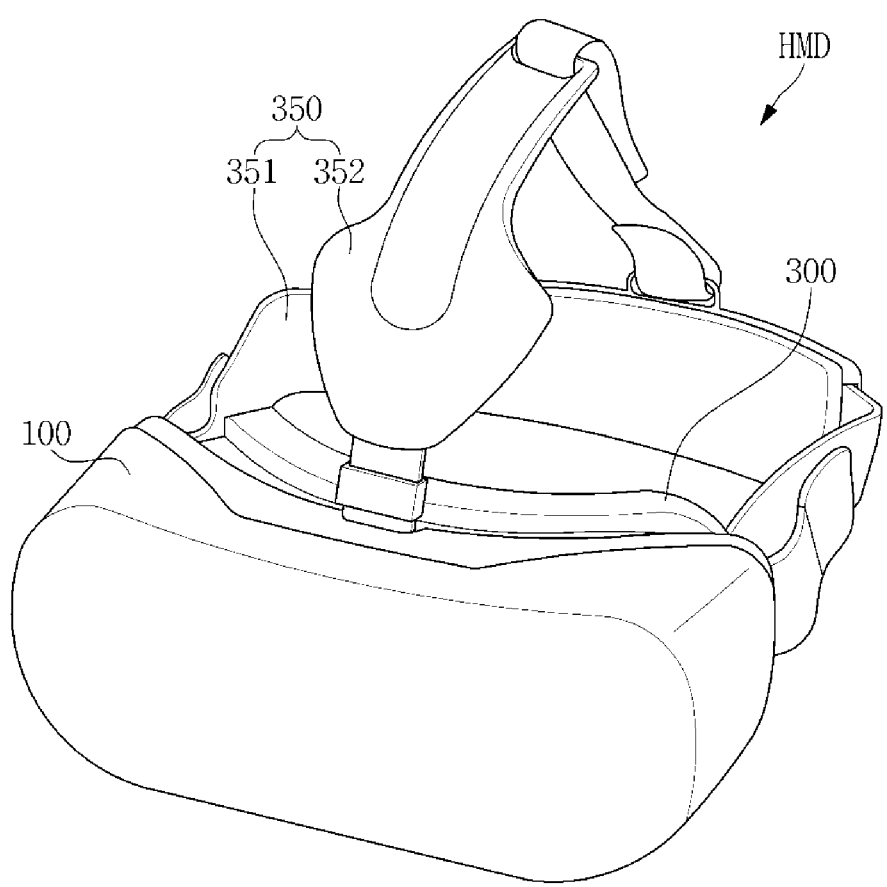
FIG. 2A is a perspective view of a head-mounted display device according to an exemplary embodiment.
Figure 2B:
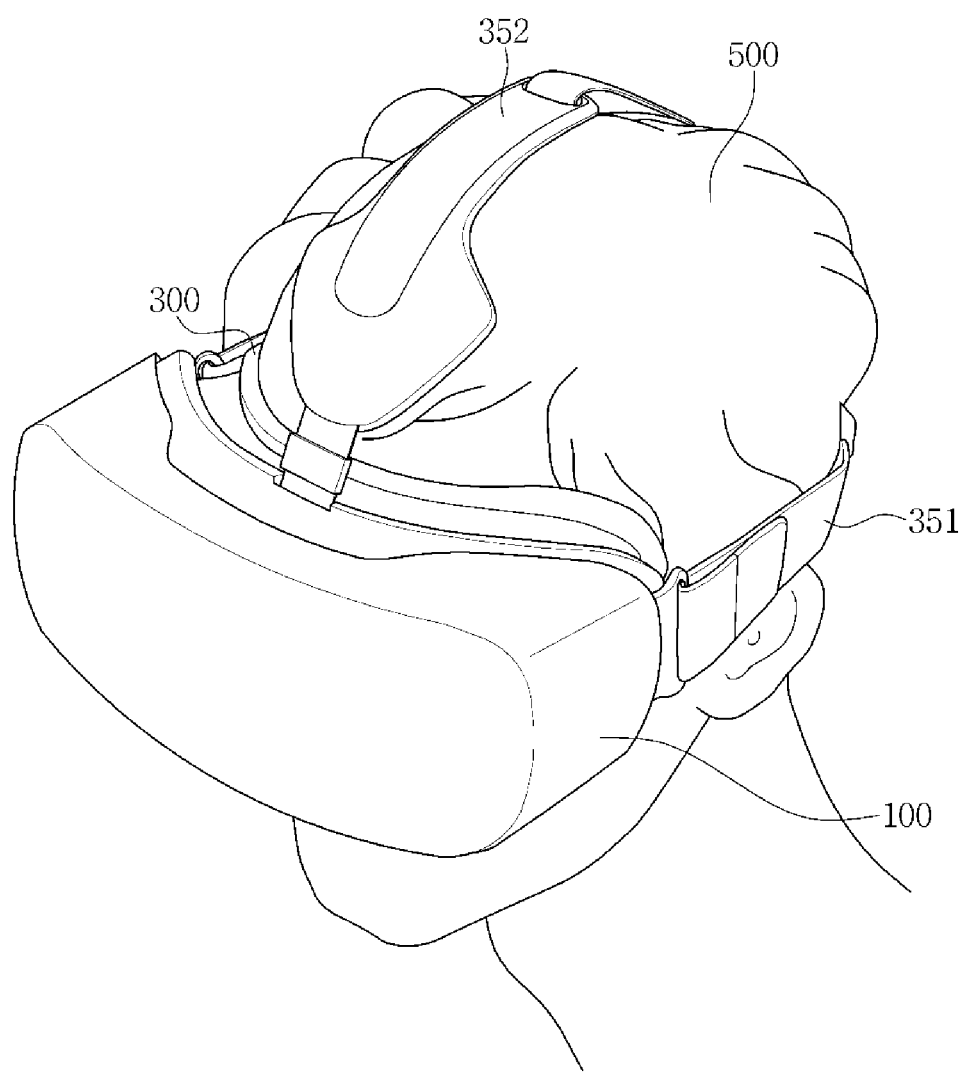
FIG. 2B is a view illustrating the use of a head-mounted display device according to an exemplary embodiment.

FIG. 2A is a perspective view of a head-mounted display device according to an exemplary embodiment, and FIG. 2B is a view illustrating the use of a head-mounted display device according to an exemplary embodiment.

Referring to FIGS. 2A and 2B, the head-mounted display device HMD is a device worn on the head of a user 500. The head-mounted display device HMD may provide an image while the actual peripheral vision of the user 500 may be blocked or substantially blocked. The user 500 wearing the head-mounted display device HMD may be more easily immersed into the virtual reality.

The head-mounted display device may include a case part 100, a cushion part 300, and a strap part 350.

The case part 100 may be worn on the head of the user 500. The display panel 200 (see FIG. 3) for displaying images, an acceleration sensor, and the like may be accommodated in the case part 100. The acceleration sensor senses the motion of the user 500 and may transmit a predetermined signal to the display panel 200. Accordingly, the display panel 200 may provide an image that corresponds to the change of the eye sight of the user 500. Accordingly, the user 500 may experience virtual reality similar to the actual reality.

In the case part 100, components having various functions other than those described above may be accommodated. For example, the image processor 10, the display unit 20, the controller 30, the communication unit 40, the storage unit 50, and the user input unit 60 described above may be accommodated therein.

The cushion part 300 may be disposed between the case part 100 and the head of the user 500. The cushion part 300 may include a material that is deformable in its shape. For example, the cushion part 300 may include a polymer resin (e.g., polyurethane, polycarbonate, polypropylene, and polyethylene), a liquid rubber, a urethane-based material, or a sponge formed by foam-molding an acrylic-based material. However, the inventive concepts are not limited thereto, and the cushion part 300 may include various other materials.

The cushion part 300 may allow the case part 100 to be in close contact with the user 500 and improve the comfort of the user 500. The cushion part 300 may be detachable from the case part 100. In an exemplary embodiment, the cushion part 300 may be omitted.

The strap part 350 may be combined with the case part 100 so that the case part 100 may be easily worn by the user 500. The strap part 350 may include a main strap 351 and an upper strap 352.

The main strap 351 may be worn along the circumference of the head of the user 500. The main strap 351 may secure the case part 100 to the user 500 so that the case part 100 may be brought into close contact with the head of the user 500. The upper strap 352 may connect the case part 100 to the main strap 351 along an upper portion of the head of the user 500. The upper strap 352 may substantially secure the case part 100 to the user 500. In addition, the upper strap 352 may disperse the load of the case part 100 to improve the wearing comfort of the user 500.

In FIG. 2A, the shapes of the main strap 351 and the upper strap 352 are shown as being adjustable in lengths, but the inventive concepts are not limited thereto. For example, in another exemplary embodiment, the main strap 351 and the upper strap 352 may have elasticity, and the length adjustable portions may be omitted.

The strap part 350 may be variously modified from those shown in FIGS. 2A and 2B, as long as the case part 100 is securely fixed to the user 500. For example, in another exemplary embodiment, the upper strap 352 may be omitted. In addition, in another exemplary embodiment, the strap part 350 may be transformed into various forms, such as a helmet combined with the case part 100, or a pair of glasses coupled with the case part 100.

Figure 3:
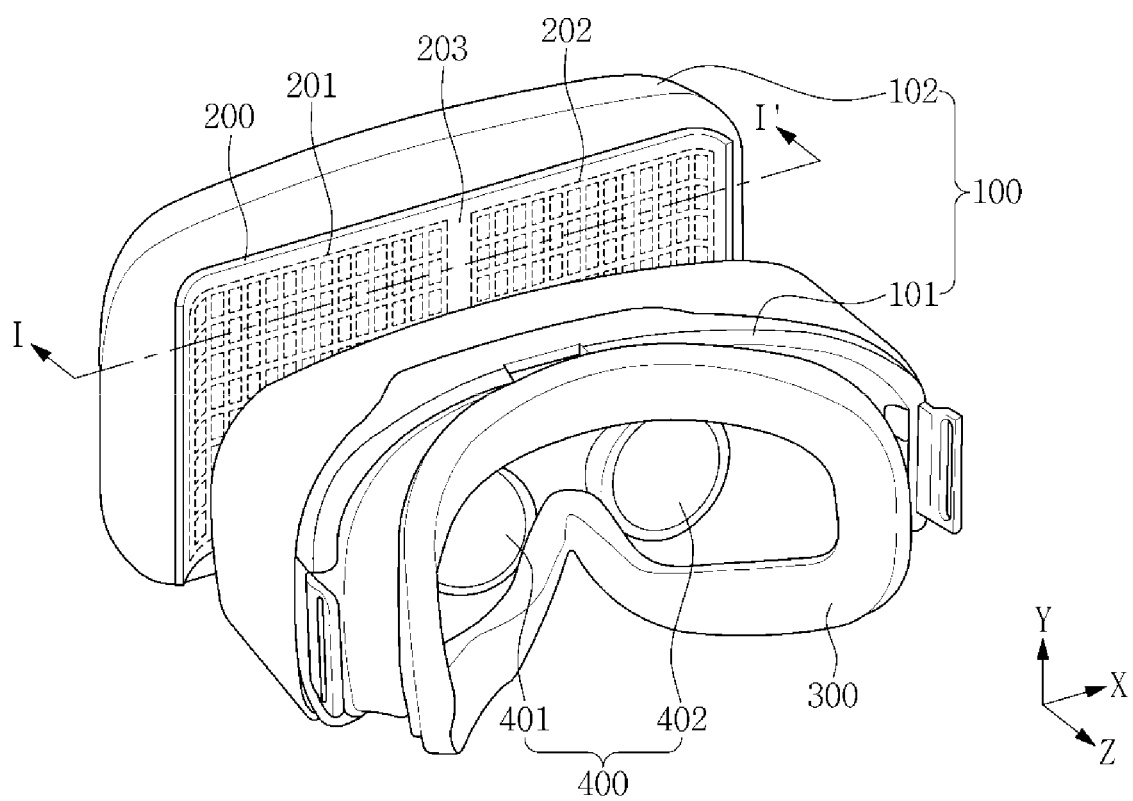
FIG. 3 is an exploded perspective view of a part of a head-mounted display device according to an exemplary embodiment.

FIG. 3 is an exploded perspective view of a part of a head-mounted display device according to an exemplary embodiment. In FIG. 3, the strap part 350 (see FIGS. 2A and 2B) is not illustrated for convenience of description.

Figure 4:
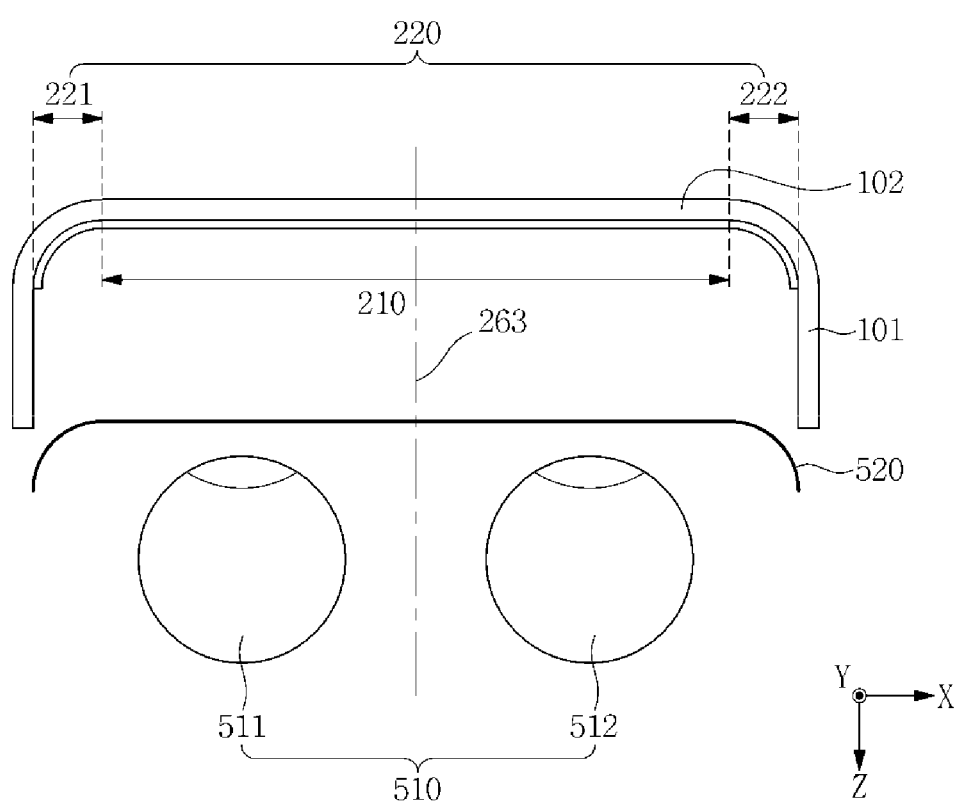
FIG. 4 is a schematic cross-sectional view of a head-mounted display device according to an exemplary embodiment.

Referring to FIG. 3, the case part 100 may be divided into a body 101 and a cover 102. A display panel 200 is disposed between the body 101 and the cover 102, and the cover 102 may cover a space where the display panel 200 is seated. FIG. 3 shows that the body 101 and the cover 102 are separated from each other, but the inventive concepts are not limited thereto. For example, as illustrated in FIG. 4, the body 101 and the cover 102 may be provided unitarily and may not be separated from each other.

The display panel 200 may be disposed between the body 101 and the cover 102. The display panel 200 may be unitarily embedded in the head-mounted display device to provide images, but the inventive concepts are not limited thereto. For example, a display device (e.g., a portable terminal) including the display panel 200 may be combined with the head-mounted display device to provide images.

Figure 10:
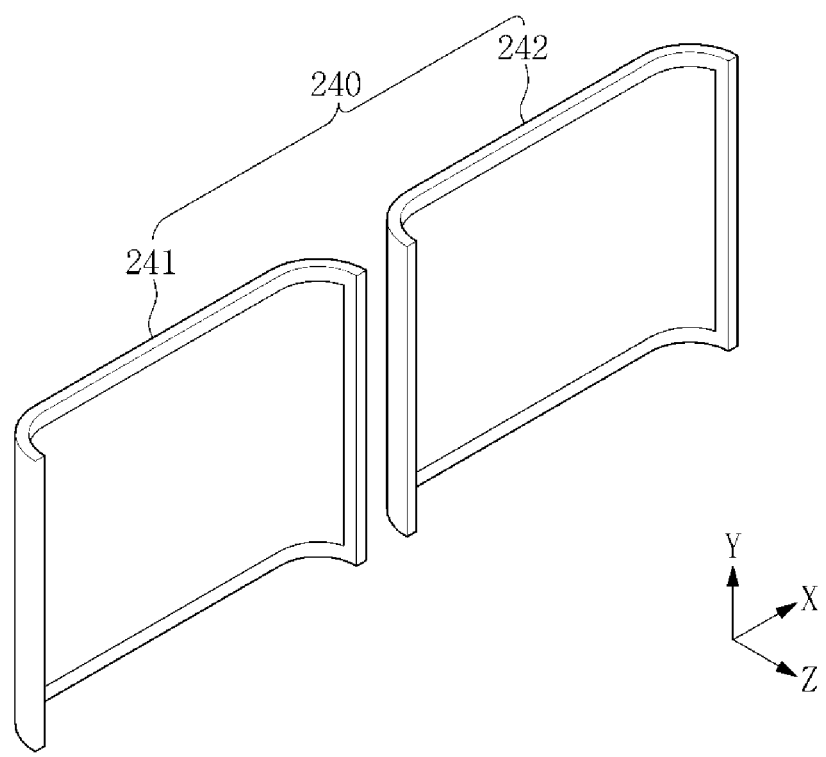
FIG. 10 is a schematic perspective view of a separated binocular head-mounted display device according to an exemplary embodiment.

In FIG. 3, a left eye image and a right eye image are displayed through a single display panel 200 (e.g., a binocular integration type) as an example. The display panel 200 may be divided into a left eye image display area 201, in which the left eye image is displayed, and a right eye image display area 202, in which the right eye image is displayed. The left eye image display area 201 and right eye image display area 202 may be driven by separate panel drivers, respectively. However, the inventive concepts are not limited thereto, and both the left eye image display area 201 and the right eye image display area 202 may be driven by a single panel driver. In addition, as illustrated in FIG. 10, according to another exemplary embodiment, the display panel 200 may include a left eye display panel 241 and a right eye display panel 242 that are separated from each other. The specific shape of the display panel 200 will be described below.

The display panel 200 generates an image corresponding to the input image data. The display panel 200 may include any one of various types of display panels, such as an organic light emitting diode ("OLED") display panel, a liquid crystal display ("LCD") panel, a plasma display panel, an electrophoretic display panel, and an electrowetting display panel. Hereinafter, the display panel 200 will be described as an OLED display panel, for example, but the inventive concepts are not limited thereto. The detailed structure of the OLED display panel will be described below with reference to FIGS. 17 and 18.

The optical system 400 may be disposed inside the body 101 of the case part 100. The optical system 400 may be a convex aspherical lens. In addition, the optical system 400 may be a Fresnel lens, which is divided into several circular strap-shaped lenses to reduce the thickness of the lens. The optical system 400 may enlarge the image provided from the display panel 200. The optical system 400 may be spaced apart from the display panel 200 in a first direction (Z-axis direction). The optical system 400 may be disposed between the display panel 200 and a user's eye 510 (see FIG. 4).

The optical system 400 may include a left eye optical system 401 and a right eye optical system 402. The left eye optical system 401 enlarges an image to provide the image to a left pupil 511 of the user 500 (see FIG. 4), and the right eye optical system 402 enlarges the image to provide the image to a right pupil 512 of the user 500 (see FIG. 4). The left eye optical system 401 and the right eye optical system 402 may be spaced apart from each other in left and right direction (X-axis direction). A distance between the left eye optical system 401 and the right eye optical system 402 may be adjusted corresponding to a distance between the two eyes of the user 500 (see FIG. 2B).

FIG. 4 is a schematic cross-sectional view of a head-mounted display device according to an exemplary embodiment, which is taken along line I-I' of FIG. 3. In FIG. 4, components other than the case part 100, the display panel 200, the user's eye 510, and a user's face line 520 are not illustrated. Hereinafter, a left and right direction (X-axis direction), an up and down direction (Y-axis direction), and a front and back direction (Z-axis direction) are defined with respect to a line of sight of the user 500 (hereinafter, "a wearer") in a state in which the display device is worn.

As illustrated in FIG. 4, left and right sides of the display panel 200 is concavely curved with respect to a line of sight of the wearer 500. More specifically, the display panel 200 includes a central planar portion 210 and left and right curved portions 220. The planar portion 210 is substantially flat. That is, the planar portion 210 has a curvature of about zero or substantially zero. The curved portion 220 extends in the left and right direction from the planar portion 210. In a cross-sectional view, a left curved portion 221 and a right curved portion 222 are symmetrical with respect to a symmetry line 263 that passes through the center of the display panel 200, which is perpendicular to the display panel 200.

As used herein, unless otherwise stated, the planar portion 210 and the curved portion 220 may refer to an area where images are displayed.

The curved portion 220 has a predetermined width in the left and right direction (X-direction) and a predetermined length in the up and down direction (Y-direction). The width direction (Z-direction) has a predetermined curvature (which is defined as the inverse of the radius of curvature) other than zero. The longitudinal direction may have a curvature of zero.

The case part 100 supports the display panel 200, so that the display panel 200 may maintain the curved state. The planar portion 210 is supported by the cover 102, and the curved portion 220 may be supported by the body 101, which extends in the front and back direction (Z-direction).

Figure 5A:
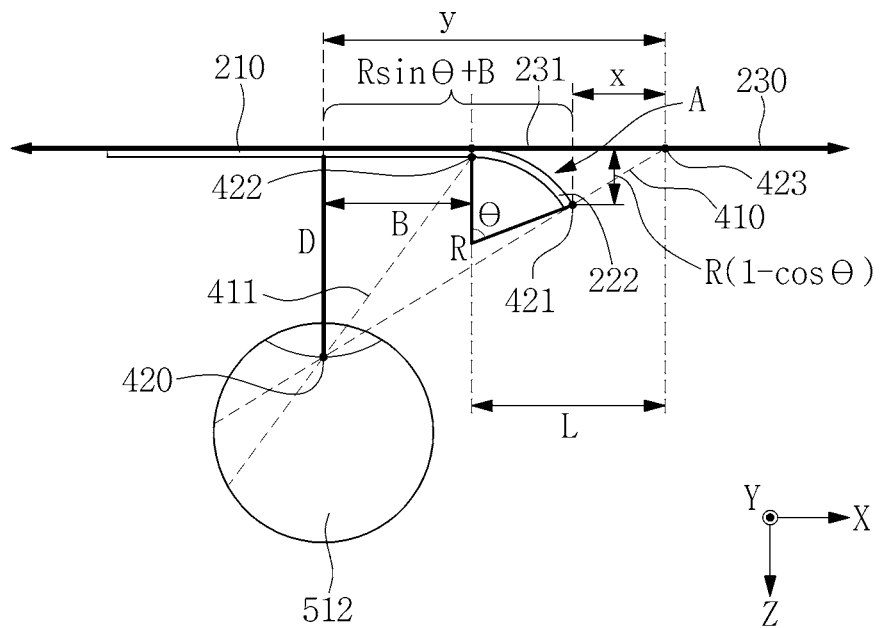
FIGS. 5A and 5B are schematic cross-sectional views of a display panel according to exemplary embodiments.

FIG. 5A is a cross-sectional view for explaining a reduction ratio of the image displayed on the curved portion 220 in the left and right direction according to an exemplary embodiment, and corresponds to the right side of FIG. 4. As illustrated in FIG. 5A, according to an exemplary embodiment, a wider viewing angle may be provided with a smaller display panel 200.

FIG. 5A illustrates a part of the right side of the planar portion 210, the right curved portion 222, and the right eye (or pupil) 512 of the user. As used herein, a point or a line described with reference to a cross-sectional view may refer to a line or a plane that passes through the point or the line, respectively, and is perpendicular to the cross-sectional view.

Referring to FIG. 5A, a virtual plane 230 is a plane extending from the planar portion 210. As used herein, "D" represents a distance between a viewing point 420 of the right eye 512 of the user 500 and the virtual plane 230 or the planar portion 210 (or "D" represents a line normal to the virtual plane 230). The distance D may have a predetermined value determined according to the arrangement of the display panel 200 in the case part 100, the structure of the cushion part 300, a refractive index of the optical system 400, and the like. Alternatively, the distance D may be a value set by the user. Still alternatively, the distance D may be a value measured by the above-described sensor.

As used herein, "R" is a radius of curvature of the curved portion 222. The center of the curved portion 222 is at a point where the planar portion 210 and the curved portion 222 meet, that is, at a starting point 422 of the curved portion 222 on a line normal to the display panel 200. More particularly, the curved portion 222 contacts the virtual plane 230. As used herein, "θ" represents a central angle of the curved portion 222. As used herein, "A" represents a width of the curved portion 220 in the left and right direction, that is, a length of an arc of the curved portion 220 in the cross-sectional view of FIG. 5A.

As used herein, "B" represents a distance between the normal line D of the virtual plane 230 that passes through the viewing point 420 and the normal line of the virtual plane 230 that passes through the starting point 422 of the curved portion 222.

Dotted lines 410 and 411 are straight lines that indicate the line of sight from the viewing point 420 of the user 500. A dotted line 410 is a straight line that passes through the viewing point 420 and an end point 421 of the curved portion 222, and a dotted line 411 is a straight line that passes through the viewing point 420 and the starting point 422 of the curved portion 222 (or the virtual plane 230). An end point 423 on the virtual plane 230 is a point where the virtual plane 230 intersects the dotted line 410.

As used herein, "L" represents a distance between the normal lines that pass through the starting point 422 on the virtual plane 230 and the end point 423 on the virtual plane 230. A plane between the starting point 422 on the virtual plane 230 and the end point 423 on the virtual plane 230 is defined as an equivalent area 231 of the curved portion 222.

$$y:D = x:R(1-\cos\theta) \quad \text{[Equation 1]}$$

$$y-x = R\sin\theta + B \quad \text{[Equation 2]}$$

$$L = x + R\sin\theta \quad \text{[Equation 3]}$$

The length L of the equivalent area 231 is derived from the above Equations 1, 2, and 3, as illustrated below in Equation 4.

$$L = \frac{(B/D)(1-\cos\theta) + \sin\theta}{1-(R/D)(1-\cos\theta)} R \quad \text{[Equation 4]}$$

In an exemplary embodiment, a length A of the curved portion is expressed by the following Equation 5.

$$A = R\theta \ (\theta \text{ in radian}) \quad \text{[Equation 5]}$$

Accordingly, a left and right image reduction ratio A/L of the curved portion with respect to the planar portion is expressed by the following Equation 6.

$$\frac{A}{L} = \frac{\theta[1-(R/D)(1-\cos\theta)]}{(B/D)(1-\cos\theta) + \sin\theta} \quad \text{[Equation 6]}$$

Figure 5B:
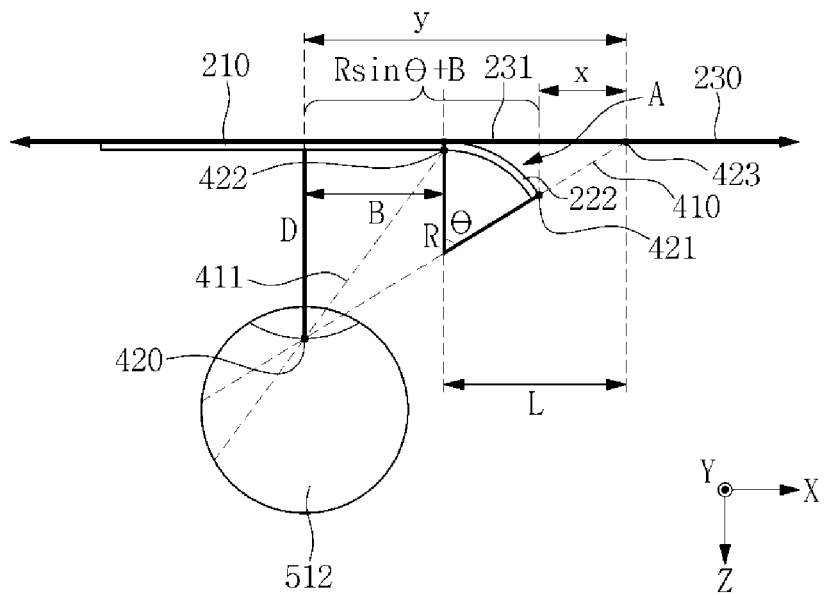

FIG. 5B is a cross-sectional view for explaining a reduction ratio of the image displayed on the curved portion 220 according to an exemplary embodiment, and illustrates a curved portion having R and θ, which are different from those of FIG. 5A.

As illustrated in FIG. 5B, a central point of the curved portion 222 is located on the line of sight 410 that passes through the viewing point 420 of the user 500 and the end point 421 of the curved portion 222. Accordingly, the line of sight 410 crosses the curved portion 222 at the end point 222 substantially perpendicularly. Other conditions are substantially the same as those described above with reference to FIG. 5A. According to the illustrated exemplary embodiment, since L=R tan θ, the left and right image reduction ratio A/L of the curved portion 222 with respect to the planar portion 210 is expressed by the following Equation 7.

$$\frac{A}{L} = \frac{\theta}{\tan\theta} \quad \text{[Equation 7]}$$

In an exemplary embodiment, the image reduction ratio A/L of the curved portion 222 with respect to the planar portion 210 is defined as a ratio of the size of a substantially same image displayed on the curved portion 222 to that displayed on the planar portion 210. For example, when a size of an image displayed on the planar portion 210 is assumed as L1, and if the same image were displayed in the equivalent area 230, the size thereof would also be L1. However, when the same image is displayed on the curved portion 222, the size is reduced to L2. Accordingly, the image reduction ratio is L2/L1.

In an exemplary embodiment, the left and right image reduction ratios of the curved portion at each point of the curved portion 222 may all be the same as A/L, or may be different according to their respective positions on the curved portion 222. For example, the left and right image reduction ratio at the starting point 422 of the curved portion 222 may be 1. That is, the image is reduced at a same proportion as the planar portion 210, and as the point moves farther away from the starting point 422, the image may be reduced at a greater ratio. In particular, the image displayed on the curved portion 222 may be reduced at a greater extent, as its distance from the planar portion 210 is increased. As used herein, the image being further reduced means that the ratio of the image of the curved portion 222 to the image of the planar portion 210 (e.g., the image reduction ratio) is smaller. Although the image reduction ratio differs depending on its position on the curved portion 222, the reduction ratio of the entire image of the curved portion may be A/L.

For example, in the illustrated exemplary embodiment shown in FIG. 5B, the image reduction ratio dA/dL at an arbitrary point (a central angle θ) is represented by the following Equation.

$$\frac{dA}{dL} = \frac{\frac{dA}{d\theta}}{\frac{dL}{d\theta}} = \cos^2\theta \quad \text{[Equation 8]}$$

Accordingly, when θ=0, that is, at the boundary line 422 between the planar portion 210 and the curved portion 222, the image reduction ratio is about 1. As θ increases, that is, as the distance from the planar portion 210 increases, the image reduction ratio decreases at a greater ratio.

Figure 6A:
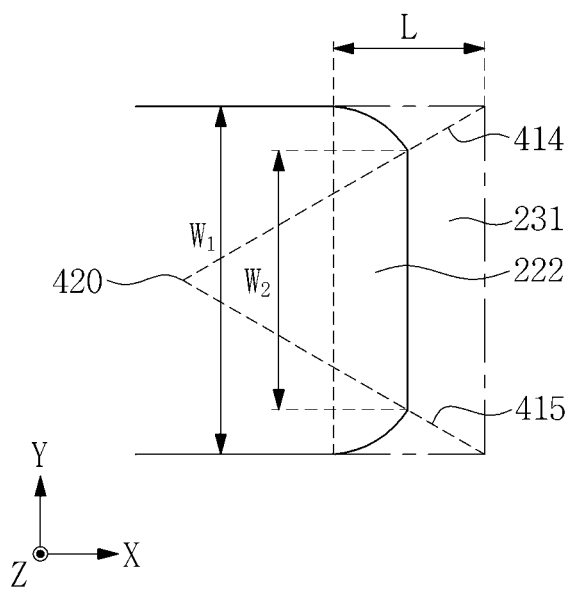
FIGS. 6A and 6B are a front view and a side view of a display panel, respectively, according to exemplary embodiments.
Figure 6B:
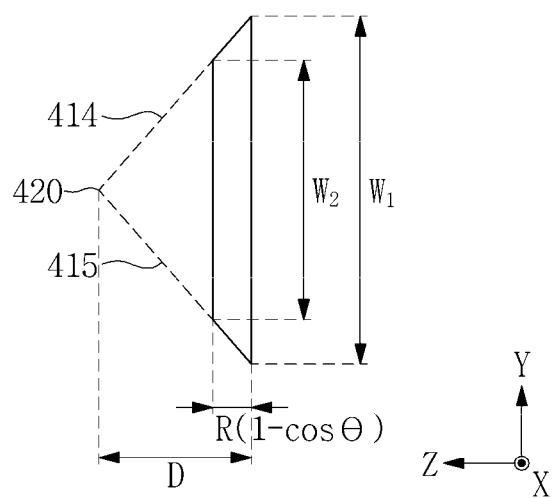

FIG. 6A is a front view and FIG. 6B is a side view illustrating a part of a display panel according to an exemplary embodiment. An up and down reduction ratio will be described with reference to FIGS. 6A and 6B. As described above with reference to FIGS. 5A and 5B, the image displayed on the curved portion 220, which is disposed on the right and left sides of the planar portion 210, may be reduced in the left and right direction. In addition, according to an exemplary embodiment, the image displayed on the curved portion 220 may be reduced in the up and down direction, as shown in FIGS. 6A and 6B.

For example, in the exemplary embodiments shown in FIGS. 5A and 5B, an up and down image reduction ratio W2/W1 at an arbitrary point (a central angle θ) may be obtained by the following Equation 9.

$$D:D-R(1-\cos\theta) = W1:W2 \quad \text{[Equation 9]}$$

In Equation 9, "W2" is a length of the curved portion 222 in the up and down direction, "W1" is a length in the up and down direction of the equivalent area 231 corresponding to the curved portion 222, "R (1−cos θ)" is a distance between an arbitrary point (a central angle θ) and the equivalent area 231, and "D" is a distance between the planar portion 210 and the viewing point 420.

Accordingly, based on Equation 9, the up and down image reduction ratio W2/W1 may be obtained by the following Equation 10.

$$\frac{W_2}{W_1} = 1 - \frac{R(1-\cos\theta)}{D} \quad \text{[Equation 10]}$$

Accordingly, when θ=0, that is, at the boundary line 422 between the planar portion 210 and the curved portion 222, the up and down image reduction ratio is about 1. As θ increases, that is, as the distance from the planar portion 210 increases, the image reduction ratio decreases at a greater ratio.

Figure 7A:
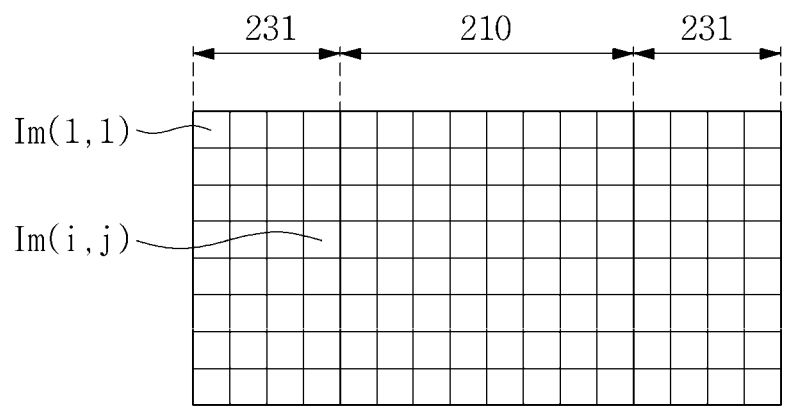
FIGS. 7A and 7B are views illustrating a non-reduced image and a reduced image, respectively, according to exemplary embodiments.
Figure 7B:
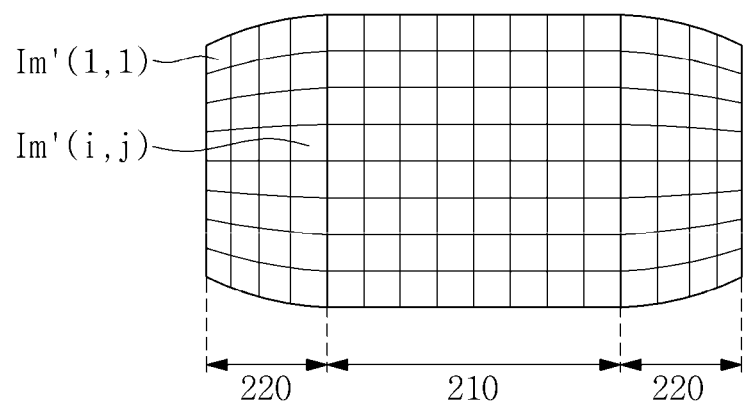

FIG. 7A is a view illustrating a non-reduced image, and FIG. 7B is a view illustrating a reduced image, according to an exemplary embodiment.

According to an exemplary embodiment, the communication unit 40 or the storage unit 50 provides a data of an image illustrated in FIG. 7A to the controller 30 or the image processor 10 (hereinafter, may be collectively referred to as "a controller 30"). The controller 30 may convert the data of the image illustrated in FIG. 7A into a data of a reduced image illustrated in FIG. 7B. However, the inventive concepts are not limited thereto, and the communication unit 40 or the storage unit 50 may provide a data of an image, which has been reduced in advance as in FIG. 7B, and the controller 30 may provide the data of the reduced image illustrated in FIG. 7B to the display unit 20.

As illustrated in FIG. 7A, in general, images are configured to be displayed on a flat display panel, and each portion of the display panel, for example, the central portion and the peripheral portion of the display panel may display images at the same ratio. Accordingly, if an image for a flat surface (hereinafter, "flat image") illustrated in FIG. 7A is displayed on the curved portion 220 of the display panel 200 as shown FIG. 4, the image may be distorted. Accordingly, the head-mounted display device according to an exemplary embodiment displays images that are reduced in the left and right direction and/or the up and down direction on the curved portion 220, as described hereinabove with reference to FIGS. 5A to 6B.

A flat image Im illustrated in FIG. 7A includes partial images Im (i, j) each having substantially the same size. All of the partial images Im (1, 1) . . . Im (i, j) . . . Im (16, 8) may be displayed on the display panel at the same rate. The flat image Im may be an original image. Alternatively, the original image may be an image that is entirely scaled at the same rate for each partial image Im (i, j) by the controller 30, according to the size of the planar portion 210 and the equivalent area 231.

The controller 30 may determine the partial image Im (i, j) to be displayed on the planar portion 210 and the partial image Im (i, j) to be displayed on the equivalent area 231 (the curved portion 220). The controller 30 partially reduces the partial image Im (i, j) of the equivalent area 231 in the left and right direction and/or the up and down direction.

As illustrated in FIG. 7B, the partial image Im (i, j) of the equivalent area 231 are further reduced in the left and right direction and the up and down direction, as they are further spaced away from the planar portion 210. The data for the partially reduced image Im' is provided to the panel driver of the display unit 20, and the panel driver displays the image Im' illustrated in FIG. 7B on the display panel 200.

Accordingly to an exemplary embodiment, the image Im', as shown in FIG. 7B, displayed on the curved portion 220 may be viewed to be substantially the same as the image Im, as shown in FIG. 7A, displayed on the virtual plane 230 or the equivalent area 231 extending from the planar portion 210. In this manner, an exemplary embodiment of the present invention may provide a wider viewing angle to the user, while using a relatively small display panel. In addition, the distortion of the image of FIG. 7A may be significantly suppressed, as the image is displayed on a general flat display panel.

Figure 8:
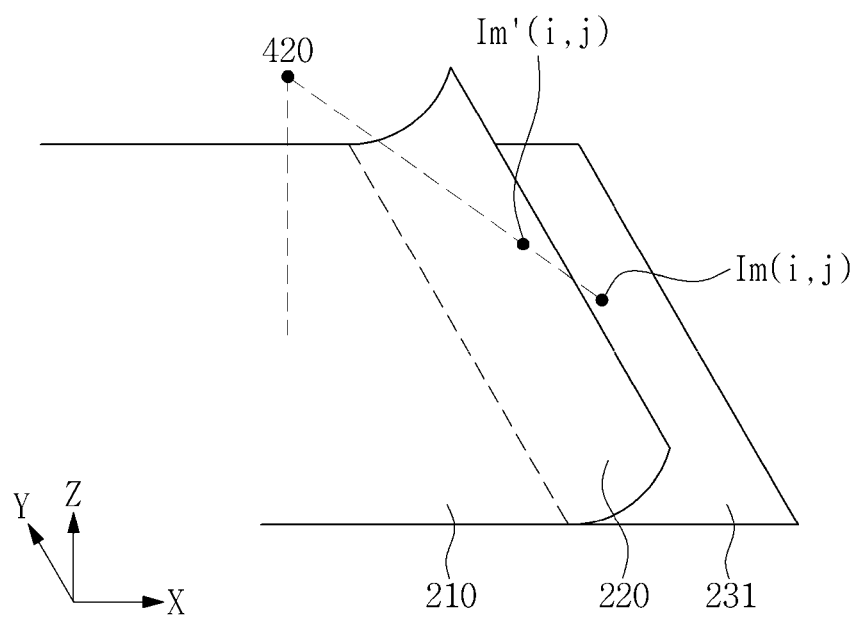
FIG. 8 is an explanatory view illustrating conversion of an image displayed on a curved portion according to an exemplary embodiment.

FIG. 8 is an explanatory view illustrating a conversion of an image displayed on a curved portion according to an exemplary embodiment.

As described above, the curved surface image Im' (hereinafter, "curved image") displayed on the curved portion 220 according to an exemplary embodiment may be viewed to be substantially the same as the flat image Im displayed on the equivalent area 231 extending from the planar portion 210.

Referring to FIG. 8, one point of the curved portion 220 and one point of the equivalent area 231, through which one straight line passes from the viewing point 420, correspond to each other, and substantially the same image may be displayed on the two points that correspond to each other. Accordingly, a partial image Im' (i, j) that corresponds to a partial image Im (i, j) at the one point of the equivalent area 231 is displayed at the corresponding one point of the curved portion 220. In addition, as described above, the curved partial image Im' (i, j) may be reduced in the left and right direction and the up and down direction.

Although FIG. 8 shows a curved portion has a partial cylinder shape, the inventive concepts are not limited thereto. The image conversion method described with reference to FIG. 8 may be applied to a curved portion having an arbitrary shape.

In addition, although FIGS. 4 to 8 show the curved portion 220 is disposed on the right and left sides of the planar portion 210, the inventive concepts are not limited thereto. The exemplary embodiments described with reference to FIGS. 4 to 8 may be equally applied to the curved portion disposed on the upper and lower sides of the planar portion 22.

Figure 9:
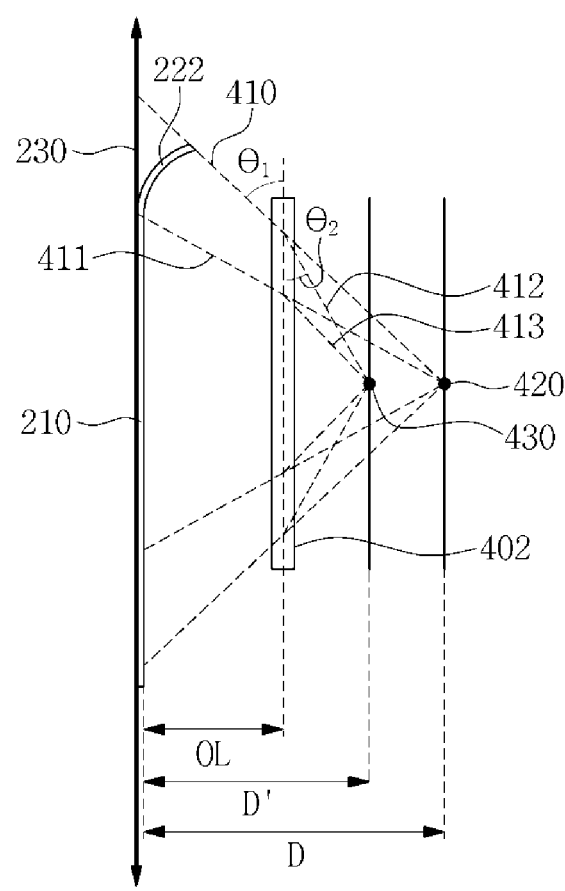
FIG. 9 is a schematic cross-sectional view of an optical system according to an exemplary embodiment.

FIG. 9 is a schematic cross-sectional view of an optical system according to an exemplary embodiment, and shows refraction of the line of sight by the optical system 400. Although FIG. 9 is described with respect to the right eye optical system 402, it may be similarly applied to the left eye optical system 401 (see FIG. 3).

As illustrated in FIG. 9, lines of sight 412 and 413 from an actual viewing point 430 of the user are refracted while passing through the optical system 400. Accordingly, in the descriptions with reference to FIGS. 5A and 5B, the lines of sight 410 and 411 viewing the curved portion 222 and the equivalent area 230 may not form a straight line with the actual viewing point 430 of the user 500.

In an exemplary embodiment, a refractive index n of the optical system 400 is expressed by the following Equation 11.

$$n = \frac{\sin\theta_1}{\sin\theta_2} \qquad \text{[Equation 11]}$$

In FIG. 9, "OL" is a distance between the planar portion 210 and the right eye optical system 402, "D'" a distance between the planar portion 210 and the actual viewing point 430 of the user 500, "D" is a distance between the planar portion 210 and the virtual viewing point 420 of the lines of sight 410 and 411 that pass through the curved portion 222.

Accordingly, when the head-mounted display device according to an exemplary embodiment includes the optical system 400, the aforementioned viewing point 420 refers to the virtual viewing point 420, rather than the actual viewing point 430 of the user, and "D" used in the Equations 1 to 7 refers to a distance D to the virtual viewing point 420, rather than a distance D' to the actual viewing point 430 of the user.

The distance D to the virtual viewing point 420 may be determined according to the distance D' to the actual viewing point 430 of the user 500 and the refractive index of the right eye optical system 402.

Figure 11:
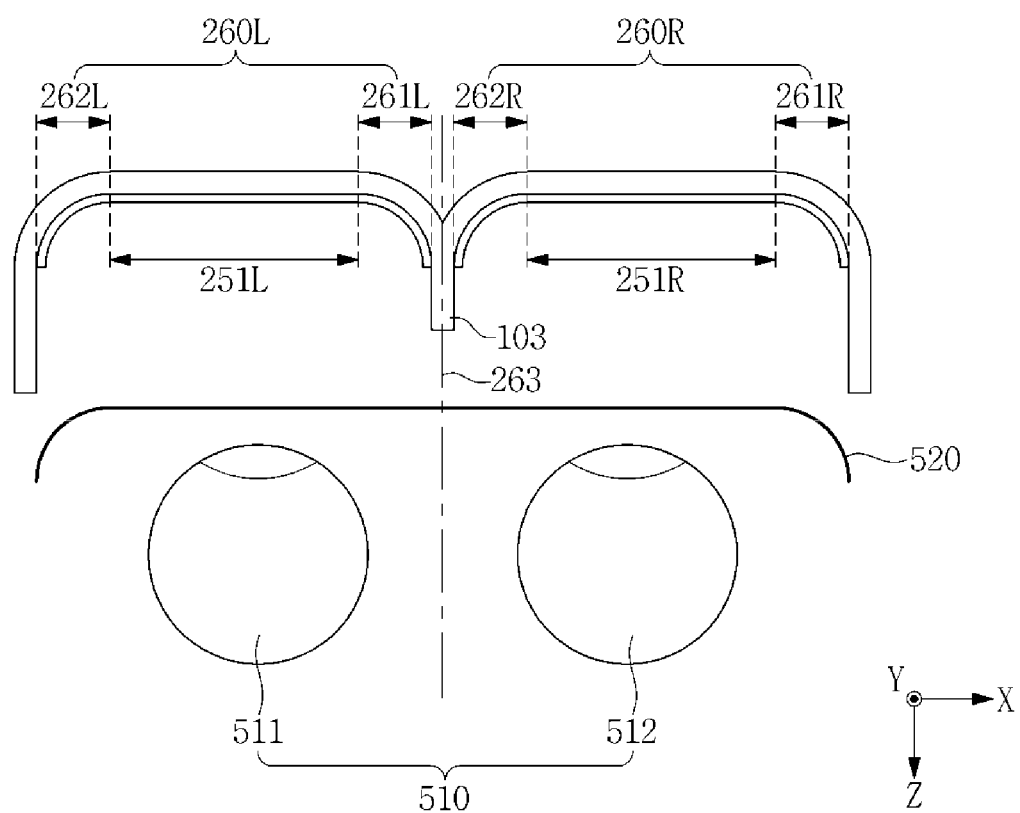
FIG. 11 is a schematic cross-sectional view of a separated binocular head-mounted display device according to an exemplary embodiment.

FIG. 10 is a schematic perspective view of a separated binocular head-mounted display panel 240 according to an exemplary embodiment. FIG. 11 is a cross-sectional view of FIG. 10. Detailed descriptions of substantially the same elements described above will be omitted to avoid redundancy.

As illustrated in FIG. 10, the display panel 240 according to an exemplary embodiment includes a left eye display panel 241 and a right eye display panel 242.

As illustrated in FIGS. 10 and 11, the display panels 241 and 242 are curved on the left and right sides with respect to the line of sight of the user 500. More specifically, the left eye display panel 241 includes a planar portion 251L at the central portion and curved portions 262L and 261L on the left and right sides of the planar portion 251L. The planar portion 251L is substantially flat. That is, the planar portion 251L has a curvature of about zero or substantially zero. The curved portion 260L extends in the left and right direction from the planar portion 251L. The curved portion 260L has a predetermined width in the left and right direction and a predetermined length in the up and down direction. The width direction has a predetermined curvature (which is defined as the inverse of the radius of curvature) other than zero. The longitudinal direction may have a curvature of zero.

In the cross-sectional view of the left eye display panel 241 according to an exemplary embodiment, the curved portion 262L on the left side and the curved portion 261L on the right side are symmetrical with respect to a symmetry line that passes through the center of the left eye display panel 241, which is perpendicular to the left eye display panel 241. The left eye display panel 241 and the right eye display panel 242 are symmetrical with respect to the symmetry plane 263 that passes through the center therebetween, which is perpendicular to the left eye display panel 241.

The case part 100 supports the display panel 240 so that the display panel 240 may maintain the curved state. In addition, the case part 100 may further include a protrusion 103, which separates the two display panels 241 and 242 and supports the right curved portion 261L of the left eye display panel 241 and the left curved portion 262L of the right eye display panel 242. The protrusion 103 may block the view of each eye so that the left eye display panel 241 may not be viewed from the right eye 512, and the right eye display panel 242 may not be viewed from the left eye 511. In the following, the description will be focused on the left eye display panel 241, but the same may be applied to the right eye display panel 242 as well.

Figure 12:
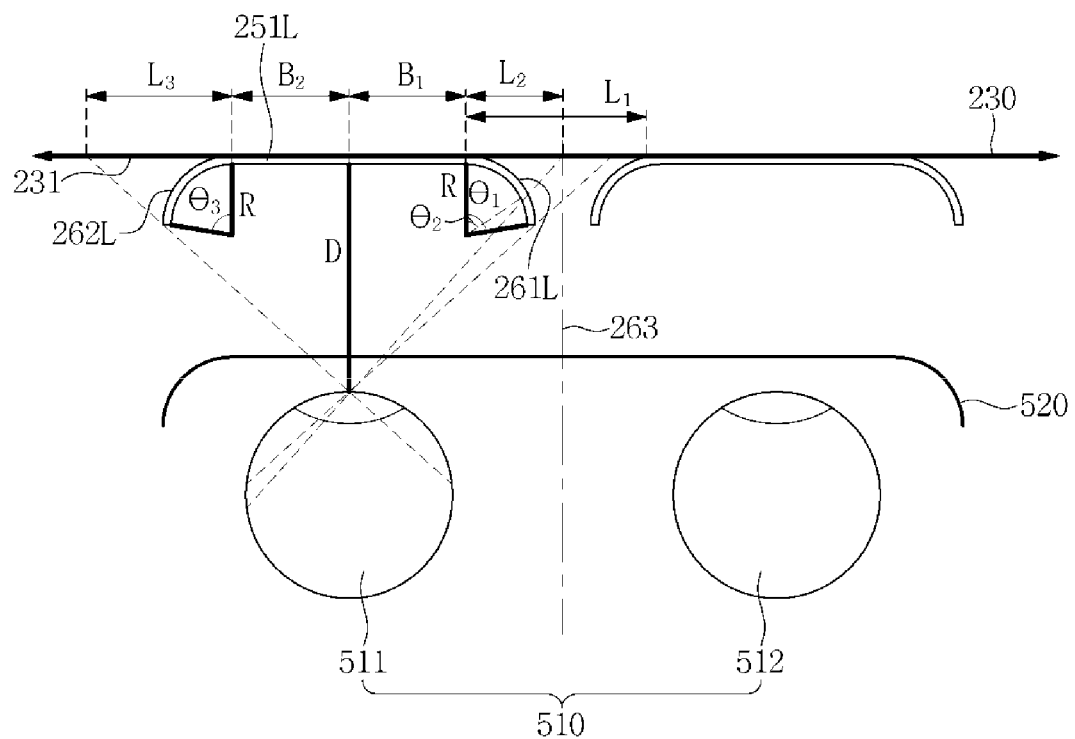
FIG. 12 is a schematic cross-sectional view of a separated binocular head-mounted display device according to an exemplary embodiment.

FIG. 12 is a schematic cross-sectional view of a separated binocular head-mounted display device according to an exemplary embodiment.

The image reduction ratio of the curved portion with respect to the planar portion described hereinabove with reference to FIGS. 5A and 5B may be applied to the illustrated exemplary embodiment, and thus, repeated descriptions thereof will be omitted to avoid redundancy.

The left curved portion 262L and the right curved portion 261L of the left eye display panel 241 have the same radius of curvature R. However, the inventive concepts are not limited thereto, and the left curved portion 262L and the right curved portion 261L may have different radii of curvature.

In addition, the left curved portion 262L and the right curved portion 261L have central angles θ3 and θ1, respectively. The central angles θ3 and θ1 may be substantially equal to each other, or may be different from each other. For example, the central angle θ3 may be larger than the central angle θ1 in order to secure the left viewing angle of the left eye 511 to be greater than the right viewing angle.

In an exemplary embodiment, an area of the right curved portion 261L where the image is displayed may be changed. For example, the image may be displayed on the entire curved portion 261L having the central angle θ1. Alternatively, according to exemplary embodiments, the image may be displayed only on a portion of the right curved portion 261L, that is, only the curved portion that has a central angle θ less than the central angle θ1.

For example, the central angle θ of the area where the image is displayed may be determined according to the input of the user 500 and according to the type of the image to be displayed (e.g., 2D or 3D image). Accordingly, the length L2 of the equivalent area corresponding to the image displayed on the curved portion may be varied. Although the present example is described with reference to the right curved portion 261L, the inventive concepts are not limited thereto, and it may also be applicable to the left curved portion 262L.

For example, a central angle θ2 may be determined so that a sight of line that passes through an end point of the curved portion having the central angle θ2 may meet the symmetry line 263 on the virtual plane 230. Accordingly, the equivalent area L2 of the right curved portion 261L of the left eye display panel 241 and the equivalent area (the area symmetric to L2) of the left curved portion 262R of the right eye display panel 242 may contact each other.

In an exemplary embodiment, the image may be displayed up to the central angle θ1 that is larger than the central angle θ2. Accordingly, the equivalent area L1 of the right curved portion 261L of the left eye display panel 241 and the equivalent area (the area symmetric to L1) of the left curved portion 262R of the right eye display panel 242 may overlap each other. Accordingly, the separated binocular display panel according to the illustrated exemplary embodiment may provide a viewing angle beyond the integrated binocular display panel 200 described above.

Figure 13A:
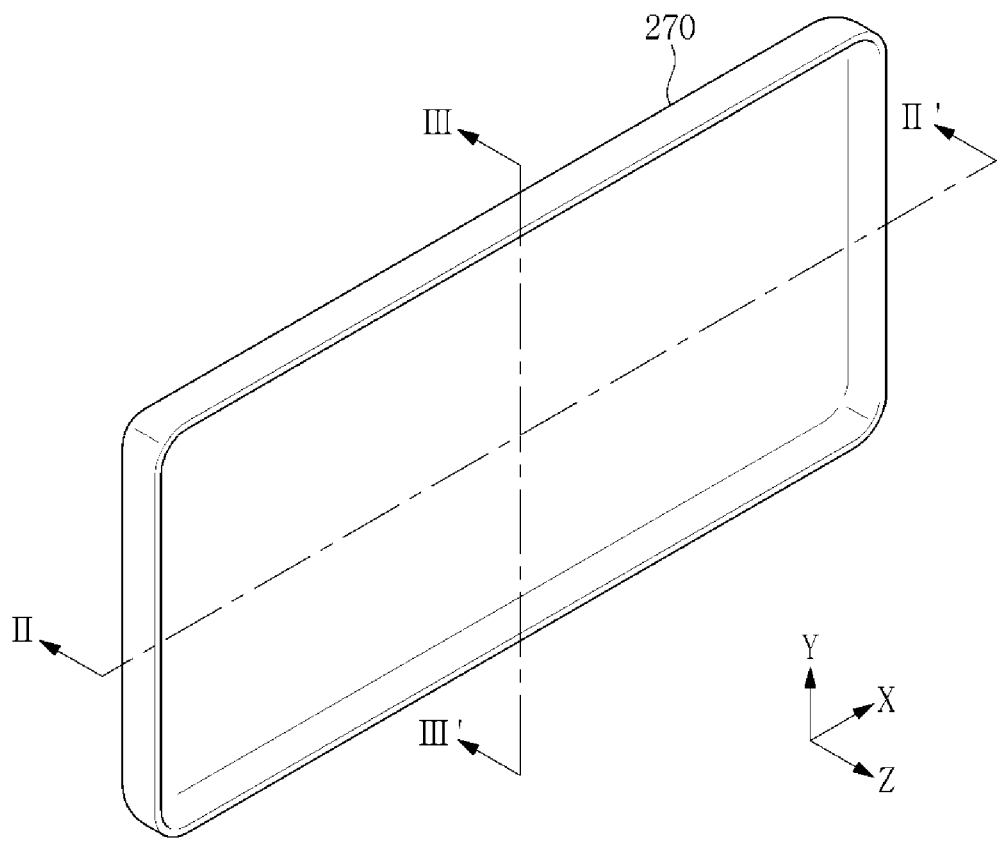
FIG. 13A is a schematic perspective view of an integrated binocular display panel according to an exemplary embodiment.
Figure 13B:
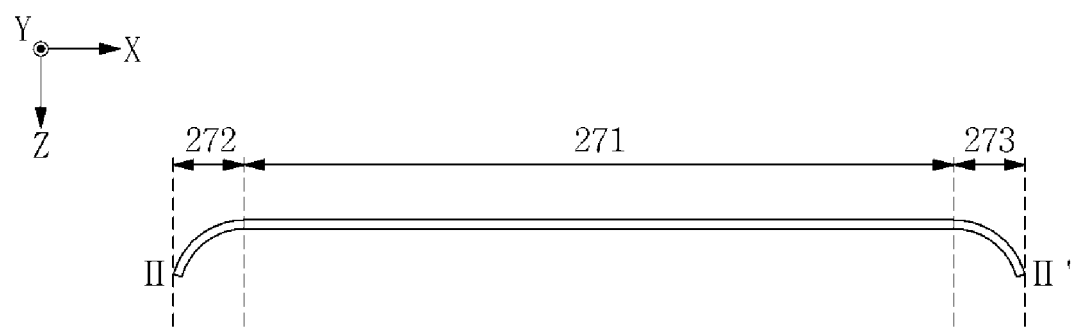
FIGS. 13B and 13C are cross-sectional views of the integrated binocular display panel of FIG. 13A.
Figure 13C:
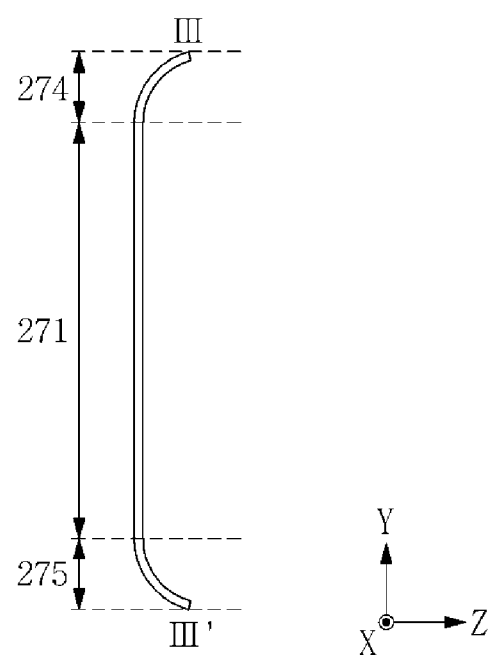

FIG. 13A is a schematic perspective view of an integrated binocular display panel according to an exemplary embodiment. FIGS. 13B and 13C are cross-sectional views of the integrated binocular display panel of FIG. 13A.

A display panel 270 illustrated in FIGS. 13A to 13C includes both left and right eye display areas.

In addition, the display panel 270 has a dome shape. More specifically, the display panel 270 includes a planar portion 271, and curved portions 272 to 275 on the left and right sides and the upper and lower sides of the planar portion 271. A radius of curvature and a central angle of the left and right curved portions 272 and 273 may be substantially the same or different from a radius of curvature and a central angle of the upper and lower curved portions 274 and 275. The specific shape of the curved portion and the image reduction ratio of the curved portion to the planar portion have already been described above, and thus, repeated descriptions thereof will be omitted to avoid redundancy.

The left and right curved portions 272 and 273 display images that are reduced in the left and right direction, and the upper and lower curved portions 274 and 275 display images that are reduced in the up and down direction. However, the inventive concepts not limited thereto, and the left and right curved portions 272 and 273 may display images that are reduced further in the up and down direction, and the upper and lower curved portions 274 and 275 may display images that are reduced further in the left and right direction.

Although the display panel 270 in FIG. 10A is illustrated as having the curved portions 272 to 275 connected to each other at corners of the display panel 270, the inventive concepts are not limited thereto. For example, the curved portions 272 to 275 may not be connected to each other at corners of the display panel 270, and may be opened.

In addition, in an exemplary embodiment, the planar portion 271 may have a substantially quadrangular shape. However, the inventive concepts are not limited thereto, and the planar portion 271 may have various shape of polygons, such as ellipses, circles, and hexagons.

Figure 14:
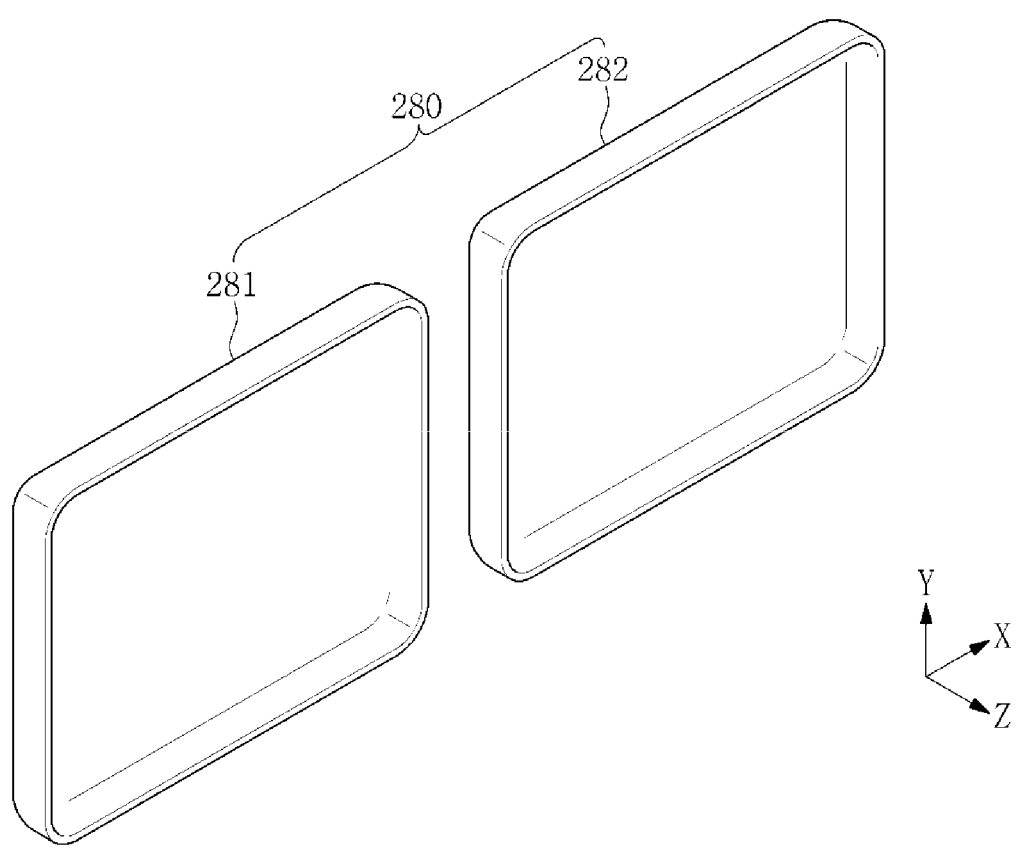
FIG. 14 is a schematic perspective view of a separated binocular display panel according to an exemplary embodiment.

FIG. 14 is a schematic perspective view of a separated binocular display panel according to an exemplary embodiment. Detailed descriptions of substantially the same elements as those described above with reference to FIGS. 13A to 13C will be omitted to avoid redundancy.

A display panel 280 illustrated in FIG. 14 includes a left eye display panel 281 and a right eye display panel 282, and each of the display panels 281 and 282 may be separated from each other.

In addition, each of the display panels 281 and 282 has a dome shape. That is, each of the display panels 281 and 282 includes a planar portion and a curved portion on the left and right sides and the upper and lower sides of the planar portion. Each of the display panels 281 and 282 may be substantially the same as the display panel 270 illustrated in FIGS. 10A to 10B except for the length in the left and right direction. In addition, the left and right curved portions of each of the display panels 281 and 282 have a structure substantially the same as or similar to the curved portion described above with reference to FIGS. 7A to 8.

In addition, in an exemplary embodiment, the planar portion 281 has a substantially quadrangular shape. However, the inventive concepts are not limited thereto, and the planar portion 281 may have various shape of polygons, such as ellipses, circles, and hexagons.

Figure 15A:
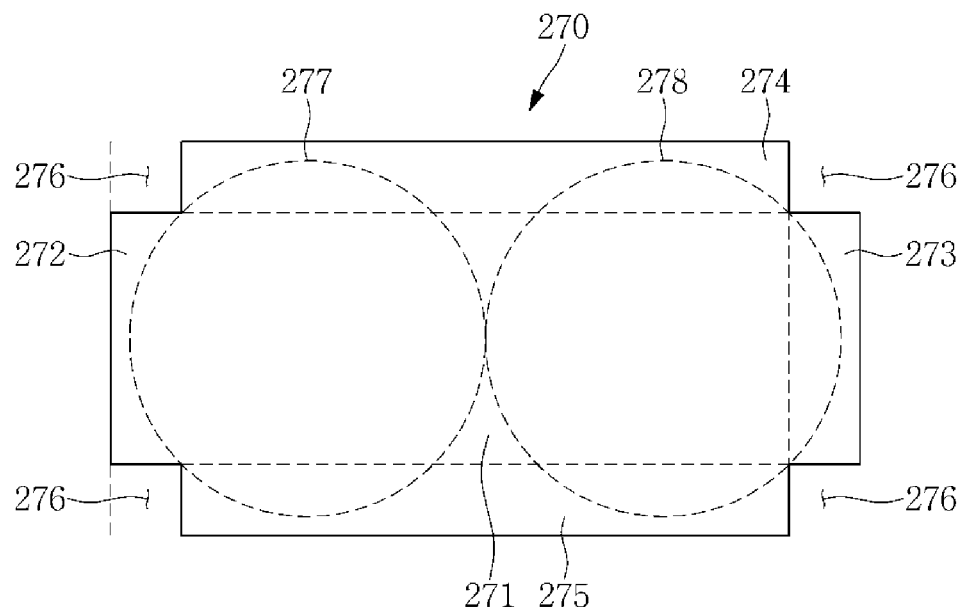
FIGS. 15A and 15B are schematic development views illustrating an integrated binocular display panel according to an exemplary embodiment.
Figure 15B:
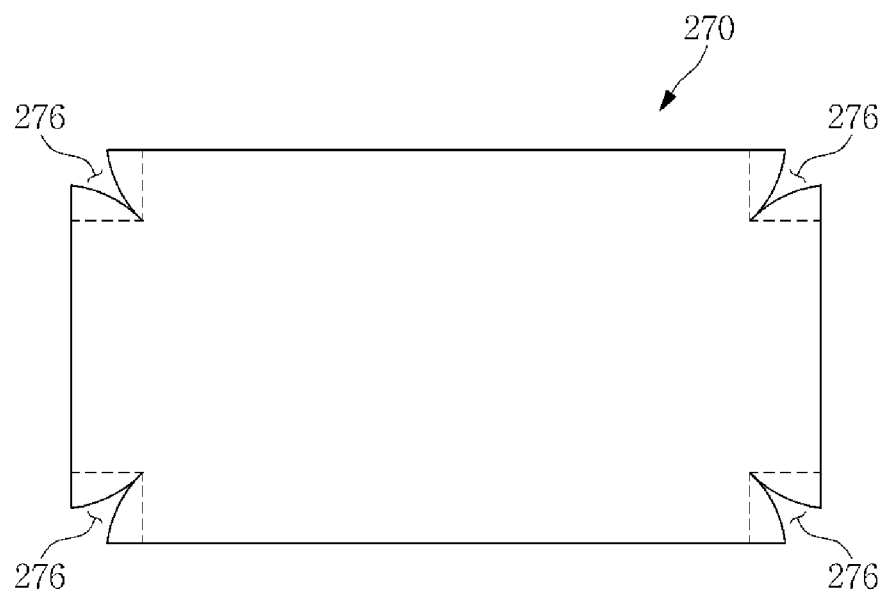

FIGS. 15A and 15B are schematic development views illustrating an integrated binocular display panel according to an exemplary embodiment. The display panel 270 illustrated in FIGS. 15A and 15B includes both the left eye and right eye display areas.

The display panel 270 may be formed by curving the flat display panel illustrated in FIG. 15A. More particularly, the curved portions 272 to 275 may be formed by curving areas extending in the up and down direction and the left and right direction from the planar portion 271 to have a predetermined curvature. A corner 276 between each curved portion may be notch-cut, so that the curved portions 272 to 275 may be curved separately. Accordingly, the display panel 270 having the developed view illustrated in FIG. 15A has its corners opened.

On the other hand, each corner 276 of the developed view illustrated in FIG. 15B may be cut in a curved line. Accordingly, the curved display panel 270 is not opened at the corners, and each curved portion 272 to 275 of the display panel 270 may be connected to each other. However, the inventive concepts are not limited thereto, and the shape of the display panel may be varied. For example, the display panel may have various types of dome shapes in various methods.

In an exemplary embodiment, viewing areas 277 and 278 of the left eye 511 and the right eye 512 may refer to the area visually recognized by the user while the user wears the head-mounted display device. Each viewing area 277 and 278 may have a substantially elliptical or circular shape. According to an exemplary embodiment, the viewing areas 277 and 278 overlap the planar portion 271 and a part of the curved portions 272 to 275, and do not overlap the corner 276. That is, the corner between the curved portions 272 to 275 may not be viewed by the user. In addition, the respective viewing areas 277 and 278 do not overlap each other.

Figure 16:
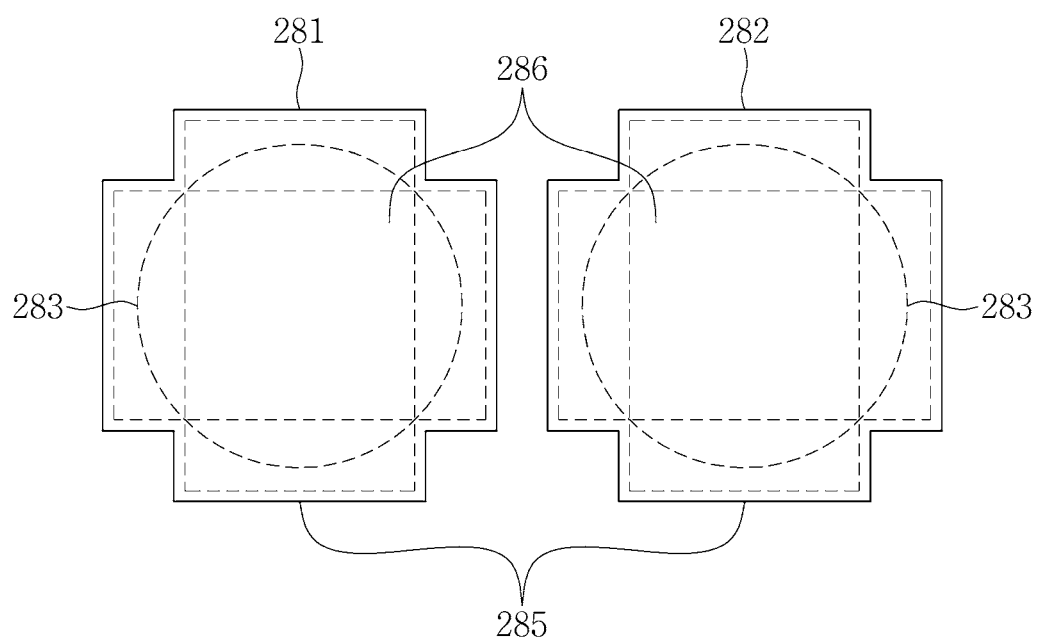
FIG. 16 is a schematic development view illustrating a separated binocular display panel according to an exemplary embodiment.

FIG. 16 is a schematic development view of a separated binocular display panel according to an exemplary embodiment. The display panel 280 illustrated in FIG. 16 includes a left eye display panel 281 and a right eye display panel 282, and each of the display panels 281 and 282 may be separated from each other.

Each of the display panels 281 and 282 may be substantially the same as the display panel 270 illustrated in FIG. 15A except for the length in the left and right direction. In addition, the left and right curved portions of each of the display panels 281 and 282 have a structure substantially the same or similar to that of the curved portion described with reference to FIGS. 10 and 11.

As described above with reference to FIG. 15A, corners between each curved portion are cut in the form of a quadrangle, and the corners of the display panel 270 having the developed view illustrated FIG. 16 are opened. In addition, the open corner may not be included in a viewing area 283 of the left eye 511 and the right eye 512.

According to an exemplary embodiment, the corners between each curved portion in each of the display panels 281 and 282 may be cut as similarly in FIG. 15B, and thus, the curved portions may be connected to each other.

In an exemplary embodiment, as illustrated in FIG. 16, each of the display panels 281 and 282 may include a display area 286, in which images are displayed, and a non-display area 285 in the periphery, in which images are not displayed. In the non-display area 285, various wirings for driving the display panels 281 and 282 may be disposed. The non-display area 285 may be included in all the display panels 200 described above.

Figure 17:
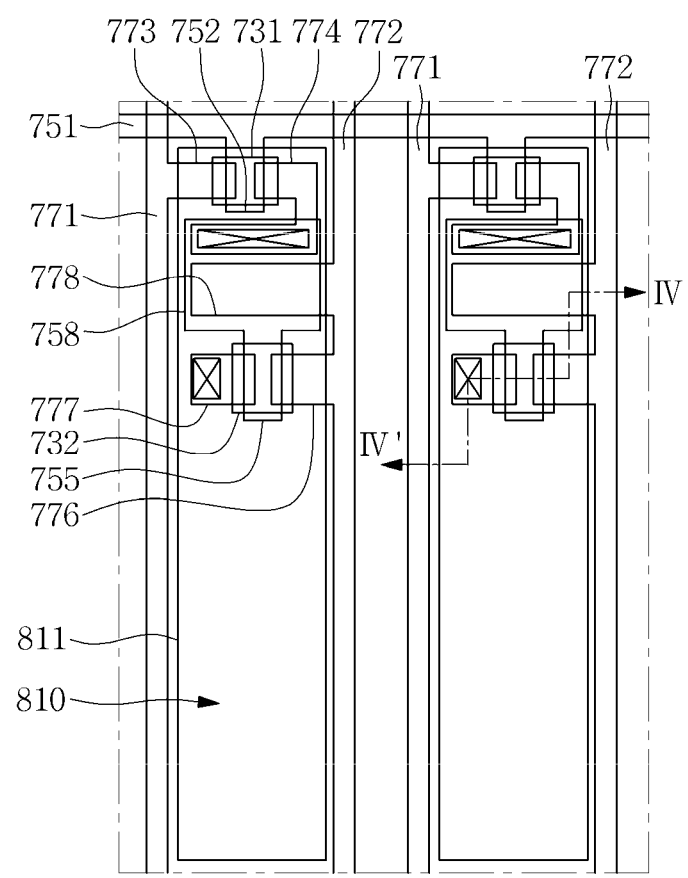
FIG. 17 is an enlarged view a part of a display panel according to an exemplary embodiment.
Figure 18:
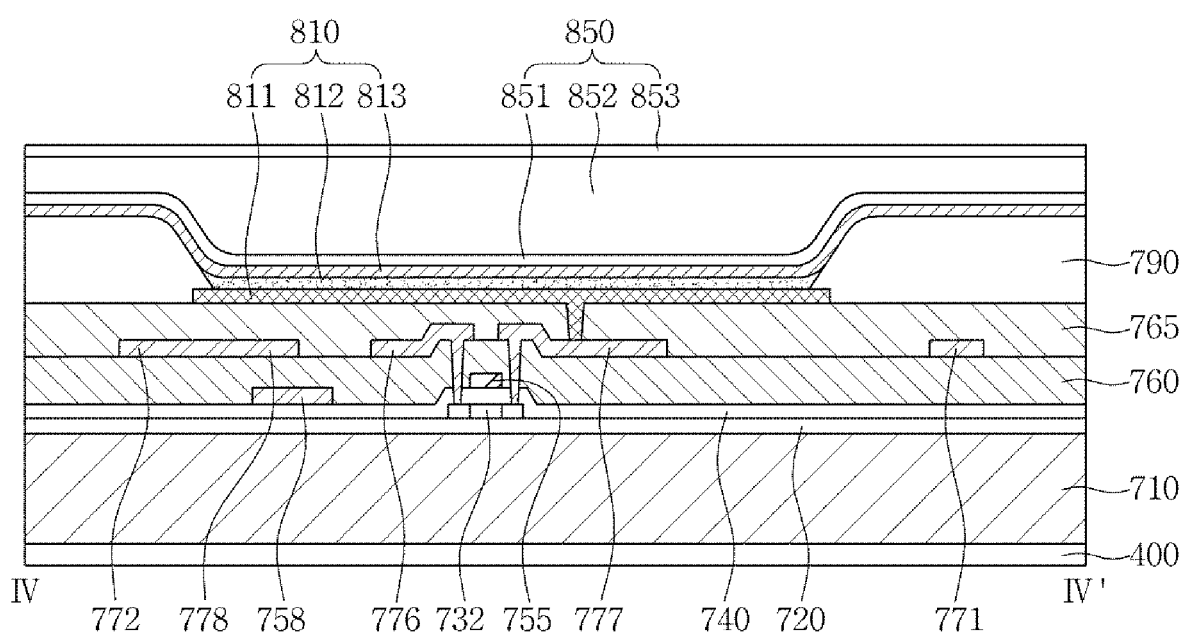
FIG. 18 is a cross-sectional view taken along line IV-IV' of FIG. 4.

FIG. 17 is an enlarged view of a part of a display panel according to an exemplary embodiment. FIG. 18 is a cross-sectional view taken along line IV-IV' of FIG. 4.

Referring to FIGS. 17 and 18, the display panel according to an exemplary embodiment includes a plurality of pixels, each including a switching thin film transistor, a driving thin film transistor, a capacitor, and an OLED 810. The OLED 810 may be largely applied to flexible display devices as it may be deposited at a relatively low temperature and has low power consumption, high luminance, and the like. As used herein, the pixel may refer to a minimum unit for displaying images, and the display panel 200 may display images through the plurality of pixels.

Although FIG. 17 shows that one pixel includes two thin film transistors and one capacitor, the inventive concepts are not limited thereto. For example, one pixel may include three or more thin film transistors and two or more capacitors, and may have various structures including additional wirings.

The display panel may include a substrate 710, a gate line 751 disposed on the substrate 710, and a data line 771 and a common power line 772 insulated from and crossing the gate line 751. One pixel PX may be typically defined by the gate line 751, the data line 771 and the common power line 772, in which they become a boundary, but the inventive concepts are not limited thereto. The pixel may be defined by a pixel defining layer or a black matrix.

The substrate 710 may include a flexible plastic material. For example, the substrate 710 may include at least one of Kapton®, polyethersulphone (PES), polycarbonate (PC), polyimide (PI), polyethyleneterephthalate (PET), polyethylene naphthalate (PEN), polyacrylate (PAR), fiber reinforced plastic (FRP), or the like.

The substrate 710 may a thickness in a range from about 5 μm to about 200 When the substrate 710 has a thickness less than about 5 it is difficult for the substrate 710 to stably support the OLED 810. On the other hand, when the substrate 710 has a thickness greater than about 200 μm, flexible characteristics of the substrate 710 may be deteriorated.

A buffer layer 720 is disposed on the substrate 710. The buffer layer 720 may prevent permeation of undesirable elements and to planarize a surface therebelow by including suitable materials for planarizing and/or preventing permeation. For example, the buffer layer 720 may include one of a silicon nitride ($SiN_x$) layer, a silicon oxide ($SiO_2$) layer, and a silicon oxynitride ($SiO_xN_y$) layer. However, the buffer layer 720 may be omitted depending on the kinds of the substrate 710 and process conditions thereof.

A switching semiconductor layer 731 and a driving semiconductor layer 732 are disposed on the first buffer layer 720. The switching semiconductor layer 731 and the driving semiconductor layer 732 may include at least one of a polycrystalline silicon layer, an amorphous silicon layer, and an oxide semiconductor, such as indium gallium zinc oxide (IGZO) and indium zinc tin oxide (IZTO). For example, when the driving semiconductor layer 732 includes a polycrystalline silicon layer, the driving semiconductor layer 732 includes a channel area, which is not doped with impurities, and p+ doped source and drain areas, which are formed on opposite sides of the channel area. In such an exemplary embodiment, p-type impurities, such as boron B, may be used as dopant ions, and $B_2H_6$ is typically used. Such impurities may vary depending on the type of thin film transistors. The driving thin film transistor according to an exemplary embodiment may employ a p-channel metal oxide semiconductor ("PMOS") thin film transistor including p-type impurities, but the inventive concepts are not limited thereto. For example, the driving thin film transistor may employ an n-channel metal oxide semiconductor ("NMOS") thin film transistor or a complementary metal oxide semiconductor ("CMOS") thin film transistor.

A gate insulating layer 740 is disposed on the switching semiconductor layer 731 and the driving semiconductor layer 732. The gate insulating layer 740 may include at least one of tetraethylorthosilicate (TEOS), silicon nitride ($SiN_x$), and silicon oxide ($SiO_2$). For example, the gate insulating layer 740 may have a double-layer structure, in which a $SiN_x$ layer having a thickness of about 40 nm and a TEOS layer having a thickness of about 80 nm are sequentially stacked.

A gate wiring, which includes gate electrodes 752 and 755 is disposed on the gate insulating layer 740. The gate wiring further includes the gate line 751, a first capacitor plate 758, and other signal lines. In addition, the gate electrodes 752 and 755 are disposed to overlap at least a portion of the corresponding semiconductor layers 731 and 732, for example, a channel area thereof. The gate electrodes 752 and 755 may substantially prevent impurities from being doped into the channel area of the corresponding semiconductor layers 731 and 732, when the impurity is doped into a source area and a drain area of the semiconductor layer 731 and 732, respectively.

The gate electrodes 752 and 755 and the first capacitor plate 758 are disposed on a substantially same layer and include a substantially same metal material. The gate electrodes 752 and 755 and the first capacitor plate 758 may include at least one of molybdenum (Mo), chromium (Cr), and tungsten (W).

An insulating interlayer 760 is disposed on the gate insulating layer 740 to cover the gate electrodes 752 and 755. The insulating interlayer 760, similar to the gate insulating layer 740, may include or be formed of silicon nitride ($SiN_x$), silicon oxide ($SiO_x$), tetraethoxysilane (TEOS), or the like, but the inventive concepts are not limited thereto.

A data wiring, which includes source electrodes 773 and 776 and drain electrodes 874 and 777, is disposed on the insulating interlayer 760. The data wiring further includes the data line 771, the common power line 772, a second capacitor plate 778, and other wirings. In addition, the source electrodes 773 and 776 and the drain electrodes 774 and 777 are connected to a source area and a drain area of the corresponding semiconductor layers 731 and 732, respectively, through a contact hole defined at the gate insulating layer 740 and the insulating interlayer 760.

As such, the switching thin film transistor includes the switching semiconductor layer 731, the switching gate electrode 752, the switching source electrode 773, and the switching drain electrode 774, and the driving thin film transistor includes the driving semiconductor layer 732, the driving gate electrode 755, the driving source electrode 776, and the driving drain electrode 777. However, the inventive concepts are not limited thereto, and configurations of the thin film transistors may be modified into various structures.

In addition, the capacitor includes the first capacitor plate 758 and the second capacitor plate 778 with the insulating interlayer 760 therebetween.

The switching thin film transistor may function as a switching element to select pixels to perform light emission. The switching gate electrode 752 is connected to the gate line 751. The switching source electrode 773 is connected to the data line 771. The switching drain electrode 774 is spaced apart from the switching source electrode 773 and is connected to the first capacitor plate 758.

The driving thin film transistor applies, to a pixel electrode 811, a driving power which allows a light emitting layer 812 of an OLED 810 in a selected pixel to emit light. The driving gate electrode 755 is connected to the first capacitor plate 758. Each of the driving source electrode 776 and the second capacitor plate 778 is connected to the common power line 772. The driving drain electrode 777 is connected to the pixel electrode 811 of the OLED 810 through a contact hole.

With the aforementioned structure, the switching thin film transistor is driven by a gate voltage applied to the gate line 751 and serves to transmit a data voltage, applied to the data line 771, to the driving thin film transistor. A voltage equivalent to a difference between a common voltage applied to the driving thin film transistor from the common power line 772, and the data voltage transmitted from the switching thin film transistor is stored in the capacitor, and a current corresponding to the voltage stored in the capacitor flows to the OLED 810 through the driving thin film transistor, and thus the OLED 810 may emit light.

A planarization layer 765 is disposed to cover the data wiring, e.g., the data line 771, the common power line 772, the source electrodes 773 and 776, the drain electrodes 774 and 777, and the second capacitor plate 778, which are patterned into a substantially same layer on the insulating interlayer 760.

The planarization layer 765 may substantially eliminate a step difference of a structure therebelow and planarize a surface therebelow, which may increase luminous efficiency of the OLED 810 to be formed thereon. The planarization layer 765 may include at least one of a polyacrylate resin, an epoxy resin, a phenolic resin, a polyamide resin, a polyimide resin, an unsaturated polyester resin, a polyphenylen ether resin, a polyphenylene sulfide resin and benzocyclobutene (BCB).

The pixel electrode 811 of the OLED 810 is disposed on the planarization layer 765. The pixel electrode 811 is connected to the drain electrode 777 through a contact hole defined at the planarization layer 765.

A pixel defining layer 790, which exposes at least a portion of the pixel electrode 811 to define a pixel area, is disposed on the planarization layer 765. The pixel electrode 811 is disposed to correspond to the pixel area defined by the pixel defining layer 790. The pixel defining layer 790 may include a resin based on, for example, polyacrylate and polyimide.

The light emitting layer 812 is disposed on the pixel electrode 811 in the pixel area, and a common electrode 813 is disposed on the pixel defining layer 790 and the light emitting layer 812. The light emitting layer 812 includes a low molecular organic material or a high molecular organic material. At least one of a hole injection layer HIL and a hole transport layer HTL may further be disposed between the pixel electrode 811 and the light emitting layer 812, and at least one of an electron transport layer ETL and an electron injection layer EIL may further be disposed between the light emitting layer 812 and the common electrode 813.

The pixel electrode 811 and the common electrode 813 may be formed as one of a transmissive electrode, a transflective electrode and a reflective electrode.

Transparent conductive oxide ("TCO") may be used to form a transmissive electrode. TCO may include indium tin oxide (ITO), indium zinc oxide (IZO), zinc oxide (ZnO), indium oxide ($In_2O_3$), of the like.

Metal, e.g., magnesium (Mg), silver (Ag), gold (Au), calcium (Ca), lithium (Li), chromium (Cr), aluminum (Al), and copper (Cu), or an alloy thereof may be used to form a transflective electrode and a reflective electrode. In such an exemplary embodiment, whether an electrode is a transflective type or a reflective type depends on the thickness of the electrode. Typically, the transflective electrode has a thickness of about 200 nm or less, and the reflective electrode has a thickness of about 300 nm or more. As the thickness of the transflective electrode decreases, light transmittance and resistance may increase. On the contrary, as the thickness of the transflective electrode increases, light transmittance may decrease.

In addition, the transflective electrode and the reflective electrode may have a multilayer structure, which includes a metal layer including metal or an alloy thereof, and a TCO layer stacked on the metal layer.

An encapsulation layer 850 is disposed on the common electrode 813. The encapsulation layer 850 includes one or more inorganic layers 851 and 853 and one or more organic layers 852. In addition, the encapsulation layer 850 has a structure, in which the inorganic layers 851 and 853 and the organic layers 852 are laminated alternately with each other. In such an exemplary embodiment, the inorganic layer 851 is disposed at a lowermost portion. That is, the inorganic layer 851 is disposed most adjacent to the OLED 810.

In FIG. 18, the encapsulation layer 850 according to an exemplary embodiment is illustrated as including two inorganic layers 851 and 853 and one organic layer 852, but the inventive concepts are not limited thereto.

The inorganic layers 851 and 853 include one or more inorganic materials of $Al_2O_3$, $TiO_2$, ZrO, $SiO_2$, AlON, AlN, SiON, $Si_3N_4$, ZnO, and $Ta_2O_5$. The inorganic layers 851 and 853 may be formed through methods, such as a chemical vapor deposition (CVD) method or an atomic layer deposition (ALD) method. However, the inventive concepts are not limited thereto, and the inorganic layers 851 and 853 may be formed through various methods generally known in the art.

The organic layer 852 may include or be formed of a polymer material. Examples of the polymer material may include, for example, an acrylic resin, an epoxy resin, polyimide and polyethylene. The organic layer 852 may be formed through a thermal deposition process. The thermal deposition process for forming the organic layer 852 may be performed in a range of temperature that may not damage the OLED 810. However, the inventive concepts are not limited thereto, and the organic layer 852 may be formed through various methods generally known in the art.

The inorganic layers 851 and 853, which have a high density of thin film, may substantially prevent or efficiently reduce permeation of, mostly, moisture or oxygen. Permeation of moisture and oxygen into the OLED 810 may be largely prevented by the inorganic layers 851 and 853.

The encapsulation layer 850 may have a thickness of about 10 μm or less. Accordingly, an overall thickness of the display panel may become significantly small. By applying such an encapsulation layer 850, the display panel may have optimized flexible characteristics.

A protective film 400 is disposed below the substrate 710. The protective film 400 may be attached to a lower portion of the substrate 710 through an adhesive. The protective film 400 may improve the strength of the display panel and substantially prevent the display panel from being damaged.

The protective film 400 may include a flexible plastic material. In addition, the protective film 400 may have various thicknesses depending on Young's modulus. The protective film 400 according to an exemplary embodiment may have a substantially same shape as that of the substrate 710.

Figure 19A:
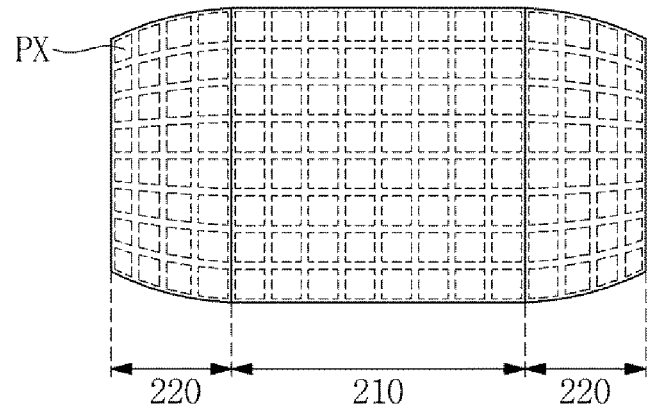
FIGS. 19A and 19B are development views of a display panel according to exemplary embodiments.
Figure 19B:
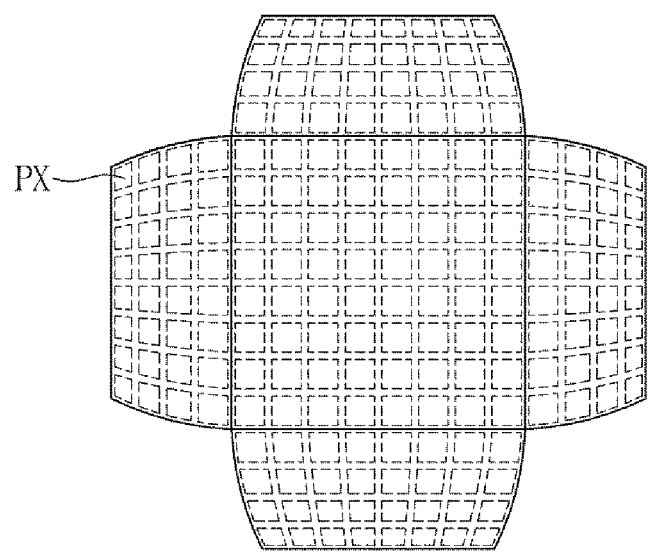

FIGS. 19A and 19B are development views illustrating a display panel according to exemplary embodiments.

Referring to FIG. 19A, the display panel 200 according to an exemplary embodiment may include a planar portion 210 and a curved portion 220 disposed at opposite sides of the planar portion 210, for example, on the left or right sides or on the upper and lower sides. Referring to FIG. 19B, the display panel 200 according to an exemplary embodiment may include the planar portion 210 and the curved portion 220 disposed on the left and right sides and on the upper and lower sides.

As illustrated in FIG. 19A, in the display panel 200 according to an exemplary embodiment, the curved portion 220 has a resolution higher than that of the planar portion 210. As used herein, the resolution may refer to the number of pixels PX per unit area or unit length. Accordingly, the pixels are disposed more densely in the curved portion 220.

According to an exemplary embodiment, the resolution of the curved portion 220 in the left and right direction (the number of pixels PX per unit length in the left and right direction) is higher than the resolution of the planar portion 210. In addition, according to an exemplary embodiment of the present invention, the resolution of the curved portion 220 in the up and down direction (the number of pixels PX per unit length in the up and down direction) is higher than the resolution of the planar portion 210.

A ratio R2/R1 of the resolution R2 of the curved portion 220 to the resolution R1 of the planar portion 210 corresponds to the reciprocal of the image reduction ratio described hereinabove with reference to FIGS. 4 to 8. That is, as the resolution becomes higher, the displayed image may be reduced to a greater extent. Accordingly, detailed descriptions of the resolution ratio R2/R1 will be omitted.

In an exemplary embodiment, as described above with reference to FIGS. 17 and 18, the display panel 200 may include the gate line 751 extending, for example, in the left and right direction and the data line 771 extending, for example, in the up and down direction. One pixel may be defined by one of the gate lines 751 and one of the data lines 771, and may be defined by these lines 751 and 771.

In an exemplary embodiment, an interval between the data lines 771, in the left and right curved portion 220 of the display panel 200 illustrated in FIG. 19A, which extend substantially in parallel in the up and down direction, may be decreased, as is disposed further away from the planar portion 210. Accordingly, the image displayed on the curved portion 220 may be reduced more in the left and right direction, as it is positioned further away from the planar portion 210.

In an exemplary embodiment, an interval between the gate lines 751, in the left and right curved portion 220 of the display panel 200 illustrated in FIG. 19A, which extend substantially in parallel in the left and right direction, may be decreased, as is disposed further away from the planar portion 210. Accordingly, the gate line 751 that passes through the center (a point most adjacent to the viewing point 420) of the planar portion 210 extends in a straight line even in the curved portion 220, but the gate line 751 that passes through upper and lower sides of the planar portion 210 may be curved in the curved portion 220 more toward the gate line 751 that passes through the center, as is disposed further away from the planar portion 210. Accordingly, the image displayed on the curved portion 220 may be reduced more in the up and down direction, as is positioned further away from the planar portion 210.

In an exemplary embodiment, in FIG. 19B, the gate line 751 and the data line 771 disposed in the curved portion on the upper and lower sides of the planar portion are disposed similarly to the data line 771 and the gate line 751 disposed in the curved portion on the left and right sides of the planar portion 210.

That is, an interval between the gate lines 751, in the upper and lower curved portion 220, which extend substantially in parallel in the left and right direction, may be decreased, as is disposed further away from the planar portion 210. In addition, an interval between the data lines 771, in the upper and lower curved portion 220, which extend substantially in parallel in the up and down direction, may be decreased, as is disposed further away from the planar portion 210. Accordingly, the data line 771 that passes through the center (a point most adjacent to the viewing point 420) of the planar portion 210 extends in a straight line even in the curved portion 220, but the data line 771 that passes through left and right sides of the planar portion 210 may be curved in the curved portion 220 more toward the data line 771 that passes through the center, as is positioned further away from the planar portion 210.

In addition, as described above, as the interval between the gate lines 751 and the interval between the data lines 771 decreases, a planar area of the pixel PX may be reduced. That is, a planar area of the pixel PX disposed at the curved portion 220 may decrease, as is disposed further away from the planar portion 210.

Accordingly, in the illustrated exemplary embodiment, a reduced image may be displayed on the curved portion 220 without image conversion (partial reduction) by the controller 30.

In FIGS. 19A and 19B, although the head-mounted display device is described as a separated binocular display panel, the above-described exemplary embodiments may be applied to the left eye display area and the right eye display area of the integrated binocular display panel.

According to one or more exemplary embodiments, the head-mounted display device may provide an improved viewing angle. In addition, the head-mounted display device according to exemplary embodiments may reduce distortion of the image viewed by the user.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A display device comprising:
a display panel comprising a planar portion and a curved portion extending from the planar portion; and
a controller to provide a data signal representing an image to be displayed on the planar portion and the curved portion to the display panel,
wherein the controller is configured to provide a data signal representing an image that is reduced at a greater extent to a portion of the curved portion that is disposed further away from the planar portion.
2. The display device of claim 1, further comprising:
a case part on which the display panel is mounted;
a cushion part disposed between the case part and a wearer; and
a strap part coupled to the case part,
wherein the case part, the cushion part, and the strap part define a viewing point of the wearer with respect to the display panel.
3. The display device of claim 1, further comprising a sensor to measure a viewing point of a wearer with respect to the display panel.
4. The display device of claim 1, wherein:
the curved portion comprises first curved portions disposed on opposite sides of the planar portion in a first direction; and
the controller is configured to provide a data signal representing an image that is reduced in the first direction to the first curved portions.
5. The display device of claim 4, wherein the controller is configured to provide a data signal representing an image that is reduced in a second direction substantially perpendicular to the first direction to the first curved portions.
6. The display device of claim 4, wherein:
the curved portion further comprises second curved portions disposed on opposite sides of the planar portion in a second direction substantially perpendicular to the first direction; and
the controller is configured to provide a data signal representing an image that is reduced in the second direction to the second curved portions.
7. The display device of claim 6, wherein the controller is configured to provide a data signal representing an image that is reduced in the first direction to the second curved portions.
8. The display device of claim 6, wherein the first curved portions and the second curved portions are spaced apart from each other at a corner of the planar portion.
9. The display device of claim 8, wherein the corner of the planar portion is not visually recognized by a wearer.
10. The display device of claim 6, wherein the first curved portions and the second curved portions are connected to each other.

11. The display device of claim 4, wherein:
the ratio of the entire curved portion is A/L, where "A" is a length of the curved portion in the first direction and "L" is a length of an equivalent area of the curved portion in the first direction; and
the equivalent area is on a virtual plane extending from the planar portion, and provides a viewing angle substantially the same as a viewing angle of the curved portion in the first direction when viewed from a wearer's viewing point.

12. The display device of claim 4, wherein one side of the curved portion contacts the planar portion tangentially.

13. The display device of claim 12, wherein the ratio of the entire curved portion is A/L, which is represented as the following Equation, $$\frac{A}{L} = \frac{\theta[1 - (R/D)(1-\cos\theta)]}{(B/D)(1-\cos\theta) + \sin\theta},$$ [Equation]

where "R" is a radius of curvature of the curved portion,
"θ" is a central angle of the curved portion,
"D" is a distance between the viewing point of a wearer and the planar portion, and
"B" is a distance in the first direction between a normal line of the planar portion that passes through the viewing point and a point where the planar portion and the curved portion meet.

14. The display device of claim 12, wherein the ratio is about 1 at a boundary between the planar portion and the curved portion, and decreases at a greater ratio as is disposed further away from the planar portion.

15. The display device of claim 12, wherein another side of the curved portion is perpendicular to a line of sight of a wearer.

16. The display device of claim 15, wherein the ratio of the entire curved portion is A/L, which is represented as the following Equation, $$\frac{A}{L} = \frac{\theta}{\tan\theta},$$ [Equation]

where "θ" is a central angle of the curved portion.

17. The display device of claim 1, wherein the reduced image is substantially the same as an image that is not reduced on a virtual plane extending from the planar portion, when viewed from a wearer's viewing point.

18. The display device of claim 1, further comprising an optical system spaced apart from the display panel by a predetermined distance.

19. The display device of claim 1, wherein:
the display panel comprises a left eye display area and a right eye display area arranged in a left and right direction with respect to a wearer; and
each of the left eye display area and the right eye display area comprises a planar portion and a curved portion.

20. The display device of claim 1, wherein:
the display panel comprises a left eye display panel and a right eye display panel arranged in the left and right direction with respect to a wearer; and
each of the left eye display panel and the right eye display panel comprises a planar portion and a curved portion.

21. The display device of claim 1, wherein the display device is a head-mounted display device.

22. The display device of claim 20, wherein the left eye display panel and the right eye display panel are separated by a protrusion disposed therebetween.

23. The display device of claim 20, wherein each of the curved portions of the left eye display panel and the right eye display panel comprises a left curved portion disposed on a left side of the planar portion and a right curved portion disposed on a right side of the planar portion.

24. The display device of claim 20, wherein each of the curved portions of the left eye display panel and the right eye display panel comprises upper and lower curved portions disposed on upper and lower sides of the planar portion.

25. The display device of claim 23, wherein the left curved portion and the right curved portion have substantially the same length in the left and right direction.

26. The display device of claim 23, wherein the left curved portion and the right curved portion have different lengths in the left and right direction.

27. The display device of claim 26, wherein:
the left curved portion of the left eye display panel is longer in the left and right direction than the right curved portion of the left eye display panel; and
the right curved portion of the right eye display panel is longer in the left and right direction than the left curved portion of the right eye display panel.

28. The display device of claim 23, wherein:
an equivalent area of the right curved portion of the left eye display panel and an equivalent area of the left curved portion of the right eye display panel contact each other; and
the equivalent area of the left or right curved portion is on a virtual plane extending from the planar portion, and the curved portion and the equivalent area of the left or right curved portion are configured to provide substantially the same viewing angle in the left and right direction, when viewed from the wearer's viewing point.

29. The display device of claim 23, wherein:
an equivalent area of the right curved portion of the left eye display panel and an equivalent area of the left curved portion of the right eye display panel overlap each other, and
the equivalent area of the left or right curved portion is on a virtual plane extending from the planar portion, and the curved portion and the equivalent area of the left or right curved portion are configured provide substantially the same viewing angle in the left and right direction, when viewed from the wearer's viewing point.

30. A display device comprising:
a display panel comprising a planar portion and a curved portion extending from the planar portion,
wherein a controller is configured to provide a data signal representing an image that is reduced at a greater extent to a portion of the curved portion that is disposed further away from the planar portion.

31. The display device of claim 30, wherein the curved portion has a resolution higher than that of the planar portion.

32. The display device of claim 30, further comprising a case part on which the display panel is seated.

33. The display device of claim 30, wherein the display device is a head-mounted display device.

34. A display device comprising:
a display panel having a planar portion and a curved portion extending from the planar portion, the display panel comprising:

a plurality of gate lines;

a plurality of data lines crossing the gate lines; and a plurality of pixels defined by the gate lines and the data lines, wherein the curved portion is configured to display an image that is reduced in size as compared with an image displayed on the planar portion, and wherein the number of pixels per unit area in the curved portion is greater than the number of pixels per unit area in the planar portion.

35. The display device of claim 34, wherein an interval between the gate lines in the curved portion decreases, as is disposed further away from the planar portion.

36. The display device of claim 34, wherein an interval between the data lines in the curved portion decreases, as is disposed further away from the planar portion.

37. The display device of claim 34, wherein an area of each of the pixels disposed in the curved portion becomes smaller, as a position thereof is further away from the planar portion.

* * * * *